United States Patent
Nagaraja et al.

(10) Patent No.: US 12,401,505 B2
(45) Date of Patent: Aug. 26, 2025

(54) AGILE CRYPTOGRAPHIC DEPLOYMENT SERVICE

(71) Applicant: VISA INTERNATIONAL SERVICE ASSOCIATION, San Francisco, CA (US)

(72) Inventors: Vinjith Nagaraja, Pflugerville, TX (US); Minghua Xu, Austin, TX (US); Jose Rios Trevino, Austin, TX (US); Gaven Watson, Palo Alto, CA (US); Pratyay Mukherjee, Sunnyvale, CA (US); Yilei Chen, Palo Alto, CA (US); Daniel Masny, Sunnyvale, CA (US); Mihai Christodorescu, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 46 days.

(21) Appl. No.: 18/551,773

(22) PCT Filed: Feb. 2, 2022

(86) PCT No.: PCT/US2022/014994
§ 371 (c)(1),
(2) Date: Sep. 21, 2023

(87) PCT Pub. No.: WO2022/211899
PCT Pub. Date: Oct. 6, 2022

(65) Prior Publication Data
US 2024/0187221 A1     Jun. 6, 2024

Related U.S. Application Data

(60) Provisional application No. 63/167,927, filed on Mar. 30, 2021.

(51) Int. Cl.
*H04L 9/08* (2006.01)

(52) U.S. Cl.
CPC .......... *H04L 9/0861* (2013.01); *H04L 9/0838* (2013.01)

(58) Field of Classification Search
CPC ............................ H04L 9/0861; H04L 9/0838
See application file for complete search history.

(56) References Cited

U.S. PATENT DOCUMENTS 10,742,420 B1     8/2020   Griffin
10,862,873 B1 *  12/2020   Carru .................... H04L 9/3073
(Continued)

FOREIGN PATENT DOCUMENTS

CN     109299618 A     2/2019
WO     2020162973 A1   8/2020

OTHER PUBLICATIONS

Application No. EP22781804.4, Extended European Search Report, Mailed On Aug. 22, 2024, 5 pages.
(Continued)

*Primary Examiner* — Ayoub Alata
(74) *Attorney, Agent, or Firm* — Kilpatrick Townsend & Stockton LLP

(57) ABSTRACT

Embodiments are directed to methods and systems for crypto-agile encryption and decryption. A computer system can possess a protocol file that identifies one or more cryptographic software modules. Using these cryptographic software modules, the computer system can generate a plurality of shared secrets and a session key, then use the session key to encrypt a message. The message can be sent to a server computer that can subsequently decrypt the message. At a later time, the protocol file can be updated to identify a different set of cryptographic software modules, which can be used to encrypt messages. Further, the server
(Continued)

computer can transmit additional cryptographic software modules to the computer system, enabling the computer system to use those cryptographic software modules to generate cryptographic keys. As such, the cryptographic protocol file can be changed in response to changes in the cryptographic needs of the computer system.

20 Claims, 8 Drawing Sheets

(56) References Cited

U.S. PATENT DOCUMENTS

| | | |
|---|---|---|
| 2009/0129586 A1 | 5/2009 | Miyazaki et al. |
| 2018/0026950 A1* | 1/2018 | Wasiq ............... H04L 9/0841 713/152 |
| 2019/0305953 A1* | 10/2019 | Le Saint ............. H04L 9/0861 |
| 2020/0084188 A1* | 3/2020 | Wysocki ............. H04L 67/34 |
| 2020/0153630 A1 | 5/2020 | Davis |
| 2021/0056053 A1* | 2/2021 | Marson ............. G06F 13/1668 |

OTHER PUBLICATIONS

Gao et al., "A Secure Cryptocurrency Scheme Based on Post-Quantum Blockchain", IEEE Access, vol. 6, Available online at: https://ieeexplore.ieee.org/stamp/stamp.jsp?arnumber=8340794, Apr. 18, 2018, pp. 27205-27213, 9 pages.

Application No. PCT/US2022/014994, International Search Report and Written Opinion, Mailed On May 9, 2022, 9 pages.

\* cited by examiner

AGILE CRYPTOGRAPHIC DEPLOYMENT SERVICE

CROSS-REFERENCES TO RELATED APPLICATIONS

This application is a 371 application of international patent application number PCT/US2022/014994, filed Feb. 2, 2022, which claims the benefit of the filing date of U.S. Patent Application No. 63/167,927, filed Mar. 30, 2021, which is herein incorporated by reference in its entirety for all purposes.

BACKGROUND

Cryptography is often used to implement secure digital communication between computers, particularly over networks such as the Internet. Typically, a computer system will possess cryptographic keys that can be used to encrypt messages, decrypt messages, and digitally sign documents. These cryptographic keys correspond to underlying cryptosystems, such as RSA, 3DES, AES, etc. In order to securely communicate messages, both the encrypting computer (the sender) and the decrypting computer (the receiver) need to possess the relevant cryptographic keys and possess the capability to perform cryptography in accordance with the cryptosystem corresponding to those keys.

While most cryptosystems in use today are secure or sufficiently difficult to break, there is no guarantee that these cryptosystems will remain secure in the future. New developments in computer technology may render these systems insecure. For example, there are already known quantum algorithms (e.g., Shor's Algorithm) that can be used to factor integers in polynomial time. Once sufficiently powerful quantum computers are created, these algorithms can be used to break cryptosystems such as RSA, rending such systems (and communications based thereon) insecure.

As a result, it is sometimes desirable to periodically update or replace the cryptosystem or cryptographic keys used to perform encryption and decryption. This can be difficult however, because of the coordinated nature of cryptographic processes. In a cryptographically secure communication network, each and every participant may need to update their respective cryptographic software in order to continue to communicate over the network. As a result, it is often difficult or time consuming for computers or their operators to modify the cryptographic protocols used for secure communication. This difficulty is even greater in large systems, where there may be thousands or millions of computer systems that need to update their respective cryptographic communications protocols.

Embodiments address these and other problems, individually and collectively.

SUMMARY

Some embodiments of the present disclosure are directed to methods for securely transmitting messages using agile cryptographic protocols. Some embodiments are additionally directed to efficient and convenient methods for modifying and updating these cryptographic protocols, for example, based on the security or performance needs of a computer system or network.

As an example, the computer system (or "client computer") can possess a message intended for a server computer. This message could comprise sensitive information, such as login information used to log into a service provided by the server computer, sensitive medical records, payment account information, etc. The computer system and server computer can agree on a particular cryptographic protocol to use when securely communicating with one another. This cryptographic protocol can be defined or identified by protocol files stored by the computer system and the server computer. The protocol file can identify one or more cryptographic software modules to generate one or more shared secrets, which can subsequently be used to derive a session key. Using the session key, the computer system can encrypt the message. The computer system can then transmit the message to the server computer, which can use a similar process to derive the session key and decrypt the message.

Later, the computer system and server computer can update the cryptographic protocol used to encrypt and decrypt messages. This update process can be performed, for example, if the cryptographic protocol is found to be insecure, or if the computer system has performance requirements (e.g., the computer system may have a high message throughput, and may require a faster encryption protocol). As part of this update process, the server computer can transmit additional cryptographic software modules to the computer system. These additional cryptographic software modules can be digitally signed, enabling the computer system to verify that they originated from the server computer, and not an imposter. Additionally, the computer system and server computer can modify their respective protocol files to identify new or different cryptographic software modules that can be used to generate the shared secrets and session key. For example, the protocol files may be updated to identify the additional software module received from the server computer, and exclude a cryptographic software module that has been found to be insecure.

One embodiment is directed to a method for securely communicating a message performed by a computer system. The computer system can identify one or more cryptographic software modules based on a computer system protocol file, wherein the one or more cryptographic software modules are a subset of a cryptographic software module library stored on the computer system. The computer system can generate one or more shared secrets corresponding to the one or more cryptographic software modules. The computer system can generate a session key using a key derivation function and the one or more shared secrets. The computer system can encrypt the message using the session key to generate an encrypted message. The computer system can transmit a message packet comprising the encrypted message and a computer system identifier to a server computer. The server computer may be configured to use the computer system identifier to identify a server computer protocol file, generate the one or more shared secrets, generate the session key, and decrypt the encrypted message. Subsequently, the computer system can update the computer system protocol file to identify an additional cryptographic software module in addition to the one or more cryptographic software modules. The computer system can additionally transmit a protocol update message to the server computer. The protocol update message can indicate that the computer system protocol file has been updated. The protocol update message can comprise the computer system identifier for use by the server computer in identifying the server computer protocol file to be updated.

Another embodiment is directed to a method for securely communicating a message performed by a server computer. The server computer can receive, from a computer system, a message packet comprising an encrypted message and a computer system identifier. The encrypted message can be encrypted using a session key generated by the computer system using a key derivation function and one or more shared secrets generated using one or more cryptographic software modules. The server computer can identify a server computer protocol file based on the computer system identifier and generate one or more shared secrets corresponding to the server computer protocol file. The server computer can generate a session key using a key derivation function and the one or more shared secrets and decrypt the encrypted message using the session key to retrieve the message. Subsequently, the server computer can transmit an additional cryptographic software module to the computer system. The additional cryptographic software module can include a digital signature. The computer system can be configured to verify the additional cryptographic software module by verifying the digital signature using a public key corresponding to the server computer, a certificate authority, or a trusted execution environment device manufacturer. The computer system can also add the additional cryptographic software module to a cryptographic software module library.

These and other embodiments of the disclosure are described in detail below. For example, other embodiments are directed to systems, devices, and computer readable media associated with methods described herein.

Terms

A "server computer" may include a powerful computer or cluster of computers. For example, the server computer can include a large mainframe, a minicomputer cluster, or a group of servers functioning as a unit. In one example, the server computer can include a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories include one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and/or XScale; and/or the like processor(s).

An "identifier" may include data used to identify something. This may include data used to identify an object, entity (such as a person or business entity), computer system, transaction, method, etc.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA, elliptic curve cryptography (ECC), or any applicable post-quantum cryptographic scheme (e.g., NTRU).

A "digital signature" may include any electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature. A digital signature may be used to demonstrate the veracity of the sender.

A "user" may include any user of some object or service. This may include, for example, a user of a "mobile device" such as a smartphone, or a user of a payment card (e.g., a credit or debit card). A user may be associated with one or more personal accounts (e.g., payment accounts) or user devices. A user may be referred to as a "cardholder" (when possessing or using a payment card), an account holder (when possessing or using an account), or a consumer (when using goods or services provided by relying entities and resource providers).

A "resource provider" may include any suitable entity that provides resources (e.g., goods, services, access to secure data, access to locations, or the like) to other entities, such as users. For example, a resource providing entity can be a merchant, a venue operator, a building owner, a governmental entity, etc. A "merchant" may typically be an entity that engages in transactions and can sell goods or services, or provide access to goods or services.

A "user device" or "mobile device" may include any suitable electronic device that may be transported and operated by a user, which may also provide remote communication capabilities over a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e., using the other device as a modem—both devices taken together may be considered a single mobile device).

A "software module" may include any instructions or code used to carry out a particular function. A software module may be part of a software application that comprising multiple software modules. A software module may comprise code, written in an interpretive language or a scripting language. This code may be executed or ran by a software application in order to carry out a desired method or function.

A "data file" may include any finite element of digital data or information stored on a computer system. Data files may be organized into a computer filing system, or another data structure, such as a database.

A "library" may include a collection of non-volatile resources used by software applications. These may include, for example, software modules used by a software application.

A "shared secret" may include a secret value (e.g., a number) that is known or derived by two or more parties and kept secret by those parties. A shared secret may be used in cryptographic processes in order to derive another cryptographic value, e.g., a symmetric cryptographic key used to perform encryption and decryption of messages sent between the parties.

A "key derivation function" may include any function used to derive a cryptographic key. A key derivation function may take one or more inputs and produce a cryptographic key corresponding to a particular underlying cryptosystem (e.g., AES). These inputs may include, for example, a seed value and a cryptographic salt or nonce. Key derivation functions may be consistent, i.e., a key derivation function will produce the same cryptographic key when provided with the same inputs.

A "key encapsulation mechanism" may include encryption techniques designed to secure symmetric cryptographic keys for transmission using asymmetric cryptographic algorithms. Using an "encapsulation function" and a public cryptographic key, a computer system may generate an "encapsulation," a data element comprising encapsulated cryptographic material (e.g., a symmetric cryptographic key). This encapsulation can be transmitted to a recipient computer, which can subsequently de-encapsulate the encapsulation using a private cryptographic key to recover the encapsulated cryptographic material. An encapsulation may be generated using post-quantum techniques, e.g., such that a sufficiently powerful quantum computer cannot "break" the encapsulation and acquire the encapsulated cryptographic material.

A "credential" may include any data that attests to some aspect of an entity. This may include, for example, a password that indicates that an entity has access to a particular service. Another example of a credential is a payment account number (or PAN) used by the entity to authorize payments from the entity's payment account. A credential may be issued to the entity by a third party, such as a financial institution.

A "certificate authority" may include any entity that issues digital certificates. A digital certificate may certify ownership of data, such as a public key by the named subject of the certificate. This may allow other parties to rely upon signatures or assertions made about the private keys corresponding to the certified public key. A certificate authority may act as a trusted third party.

DETAILED DESCRIPTION

Figure 1:
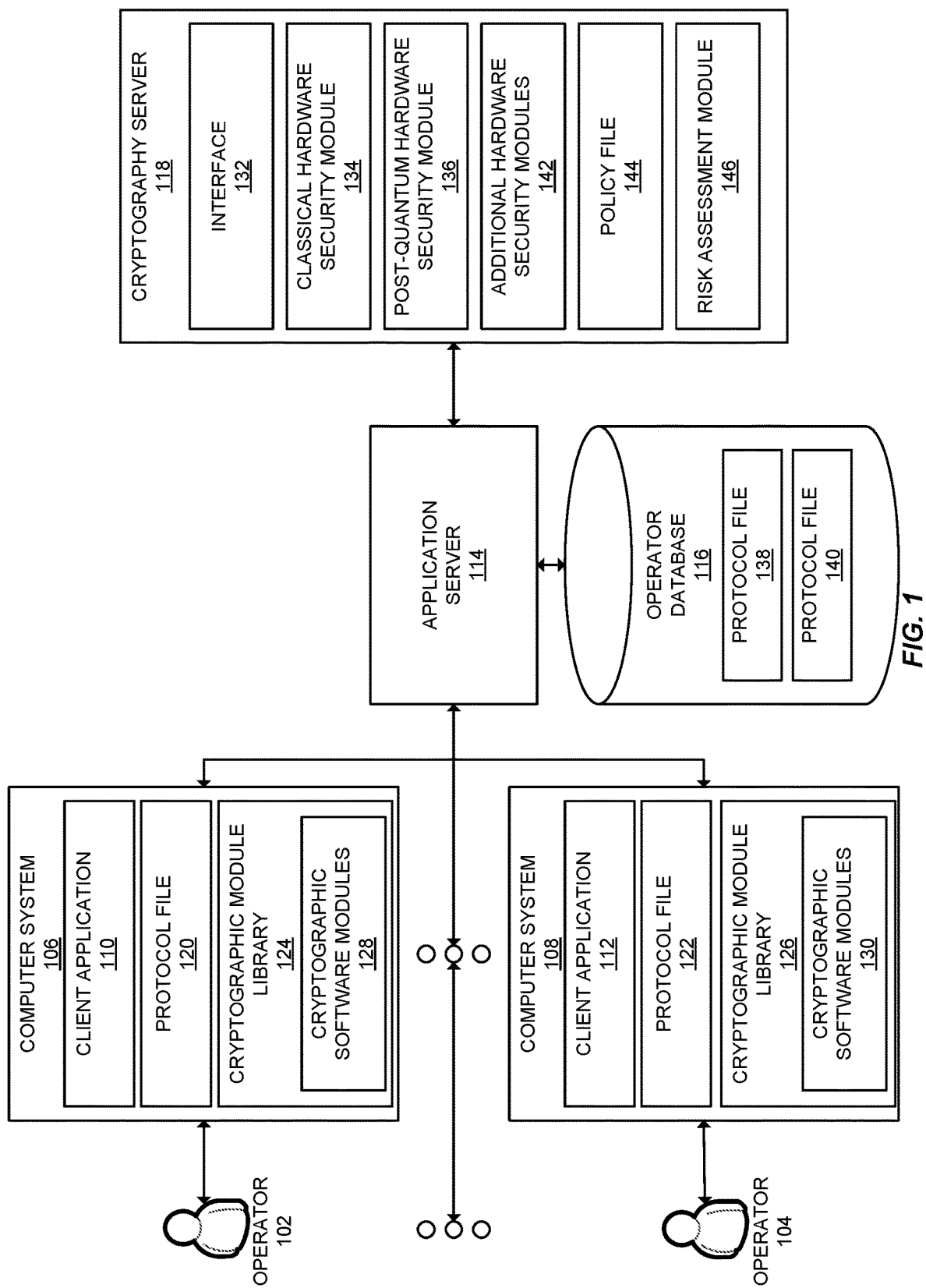
FIG. 1 shows an exemplary system block diagram of an agile cryptographic deployment service according to some embodiments.

As stated above, embodiments are directed to securely transmitting messages using a flexible, crypto-agile protocol. Embodiments may be used in a variety of applications, computer configurations, and network architectures, such as a client-server architecture, in which a computer system (sometimes referred to as a "client computer") can operating a client application and may be in communication with a server computer. The server computer can provide computational resources used by the client application. As an example of a potential application for embodiments, a client application operating on a computer system can be a software application used to perform point of sale operations, particularly operations relating to processing payments. As part of these point-of-sale operations, the computer system may periodically transmit messages to the server computer. These messages may comprise, for example, payment information such as payment account numbers (PANs), or login information used by the client application to access computational resources stored on the server computer.

Because transmitted messages can comprise private or otherwise sensitive information, it may be desirable for the computer system to encrypt the messages before transmitting the messages to the server computer. The computer system may encrypt the messages in accordance with a cryptographic protocol that has been negotiated between the computer system and the server computer. This cryptographic protocol may be defined by a cryptographic protocol file, a data file that identifies cryptographic software modules (from among cryptographic software modules in a cryptographic software library) that can be used to encrypt the messages, such that they can be securely transmitted and decrypted by the server computer. The computer system can use one or more cryptographic software modules, identified by the protocol file, to generate one or more secret shares, which can in turn be used to generate a session key used to encrypt the message. These secret shares may comprise cryptographic keys corresponding to their underlying cryptographic software modules. For example, a secret share produced using an RSA software module may comprise an RSA cryptographic key. The session key may be derived using a hybrid key derivation function that takes the shared secrets as inputs and produces the session key as an output.

After encrypting the message with the session key, the computer system can generate a message packet comprising the encrypted message and a computer system identifier. The computer system can transmit the message packet to the server computer. Using the computer system identifier, the server computer can determine the cryptographic protocol used by the computer system to encrypt the message. The server computer can generate a session key in accordance with the relevant cryptographic protocol, using methods similar to those used by the computer system. Afterwards, the server computer can use the session key to decrypt the encrypted message.

In some embodiments, the computer system and server computer can use a key encapsulation mechanism to enable the server computer to decrypt the encrypted message. In broad terms, the computer system can use one or more public key (corresponding to one or more cryptographic software modules used to generate the secret shares) in order to generate one or more encapsulations corresponding to the one or more secret shares used to generate the session key. The computer system can transmit these encapsulations to the server computer, either in the message packet or in any subsequent messages or message packets. The server computer can de-encapsulate these encapsulations using a de-encapsulation function and one or more corresponding cryptographic keys (e.g., private keys corresponding to the one or more public keys). In this way the server computer can acquire the secret shares and use the secret shares to generate the session key, which can thereafter be used to decrypt the encrypted message.

The server computer can possess a protocol file corresponding to the computer system associated with the received computer system identifier. This protocol file may be referred to as a "server computer protocol file," and may be stored in a database. The server computer can use the computer system identifier to look up the server computer protocol file in the database using the computer system identifier. The server computer can then generate a session key in accordance with the cryptographic protocol defined by the server computer protocol file and decrypt the encrypted message. The server computer protocol file may be one of many server computer protocol files, and each server computer protocol can correspond to a different client computer and client computer protocol file.

Occasionally, the computer system and server computer can update the cryptographic protocol used to securely transmit messages. As an example, the cryptographic protocol can be updated if one or more of the cryptographic software modules used to generate the session key are found to be insecure. This could happen if advances in computer technology lead to new cryptographic attacks that can break the underlying cryptosystems (such as the development of reliable quantum computers). As another example, the cryptographic protocol can be updated if the computer system has particular performance requirements. A computer system that transmits messages at a high rate may require a cryptographic protocol that encrypts or decrypts messages more quickly than the current cryptographic protocol, consequently, the computer system and the server computer can update the cryptographic protocol to accommodate these requirements.

In summary, the update process can involve the server computer provisioning one or more additional cryptographic software modules to the computer system, the computer system and server computer updating their respective protocol files, and the computer system and server computer testing the new cryptographic protocol.

As stated above, as part of the update process, the server computer can transmit an additional cryptographic software module to the computer system. The additional cryptographic software module may be digitally signed by the server computer, a certificate authority, or a trusted execution environment device manufacturer. The computer system may use the digital signature to verify that the additional cryptographic software module is legitimate. The computer system can include the additional cryptographic software module in a cryptographic software module library. Notably, in some cases, the cryptographic protocol may be updated to use a different software module or combination of software modules already available in the computer system's cryptographic software module library. As such, the step of transmitting the additional cryptographic software module to the computer system may be optional.

After the computer system (optionally) receives the additional cryptographic software module from the server computer, the computer system and the server computer can update their respective protocol flies. As a reminder, the protocol file can identify the cryptographic software modules used by to generate the secret shares, which are subsequently used to generate the session key. The protocol files can be updated to change the cryptographic software modules that the protocol file identifies. For example, the protocol files can be updated to identify the additional cryptographic software module received from the server computer. The protocol file can also be updated to no longer identify one or more cryptographic software modules, e.g., if these one or more cryptographic software modules have been proven to be insecure.

After the computer system receives any additional software modules and the protocol files are updated, the computer system and server computer can test the new cryptographic protocol to verify that the computer system and the server computer can use the new protocol file to securely communicate messages. The computer system can generate a test message, then encrypt the test message according to the new cryptographic protocol (e.g., by generating secret shares using the newly identified cryptographic software modules, by generating a session key using those secret shares, etc.). The computer system can transmit the encrypted test message to the server computer. The server computer can decrypt the message according to the new cryptographic protocol and generate an indication message that can be sent back to the computer system. The computer system can evaluate the indication message to determine if the test was successful.

As an example, the indication message can comprise the original test message, or a hash of the test message. The computer system can compare the indication message to the test message, or to a hash of the test message in order to determine if the test was successful. Alternatively, the test message sent to the server computer may be an expected or known message. After decrypting the test message, the server computer can compare the decrypted test message to the expected test message. If they match, the server computer may transmit an indication message "TRUE" back to the computer system. If they do not match, the server computer may transmit a message "FALSE" back to the computer system. If the test was not successful, the computer system and server computer can renegotiate or otherwise modify the cryptographic protocol and attempt the test again. If the test was successful, the computer system and server computer can use the updated cryptographic protocol to securely transmit any further messages sent by the computer system to the server computer.

Embodiments of the disclosure provide several advantages. Particularly, the use of computer system protocol files, server computer protocol files, and cryptographic software modules makes it comparatively quick and easy for operators of computer systems and server computers to update their cryptographic communication protocol in an automated, crypto-agile manner. In order to modify the cryptographic protocol, both the computer system and the server computer can modify their respective protocol files to reflect the same change in the cryptographic protocol. This is in contrast to conventional systems, where cryptographic protocols are typically "hardcoded" into particular applications or communication implementations and are difficult or impossible to modify. Agile and automated updates for cryptographic protocols are particularly valuable in large systems, such as payment processing networks, which may comprise large numbers of merchant computer systems, each with their own respective cryptographic protocol.

Additionally, embodiments of the present disclosure can help protect encrypted messages against a cryptographic attack or type of computer system (e.g., quantum attacks, or other, yet unknown forms of cryptographic attacks) designed in the future, even systems designed to break or exploit mathematical or cryptographic assumptions. By allowing the modification of the cryptographic protocol, embodiments enable a secure, agile moving target defense.

The remainder of the present disclosure is organized as follows: Section I describes an exemplary system according to embodiments with reference to FIG. 1. Section II describes an overview of some methods according to embodiments, including registration, encryption and decryption, and updating a cryptographic protocol (with reference to FIG. 2). Section III describes registration in more detail with reference to FIG. 3. Sections IV describes encryption and decryption in more detail with reference to FIGS. 4 and 5. Sections V describes updating a cryptographic protocol with reference to FIGS. 6 and 7. Section VI describes using the new cryptographic protocol to encrypt and decrypt messages. Lastly, Section VII describes a computer system according to some embodiments, with reference to FIG. 8.

I. Overview of Crypto-Agile System

FIG. 1 shows a block diagram of a system according to some embodiments. Any number of computer systems, such as computer systems 106 and 108, may be in communication with an application server 114 via their respective client applications (e.g., client applications 110 and 112). These computer systems may be owned or operated by operators such as operators 102 and 104. The application server 114 may be any suitable server, and thus the term "application" should not be viewed as limiting in of itself.

It should be understood that the computers and other devices (e.g., computer systems 106-108, application server 114, operator database 116, cryptography server 118, etc.) shown in FIG. 1 can be in operative communication with each other through any suitable communication channel or communications network. Suitable communications networks may comprise any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocol such as, but not limited to File Transfer Protocol (FTP); HyperText Transfer Protocol (HTTP); Secure Hypertext Transfer Protocol, etc.

The computer systems 106 and 108 may use their respective client applications 110 and 112 to perform operations associated with the function of the client applications. For example, if the client application corresponds to a point-of-sale application, the computer systems 106 and 108 may use client applications 110 and 112 to perform operations typically associated with a point-of-sale terminal. The client applications 110 and 112 may primarily utilize computational resources (e.g., data, functions, code, memory, processing, etc.) stored, executed, or included on the application server 114 rather than computer system 106 or computer system 108. This configuration may be advantageous because it can reduce the computational burden on computer systems 106 and 108 and enables computationally weaker systems (such as smartphones, tablets, PDAs, etc.) to perform operations that they typically are unable to perform. As one example, computer systems 106 and 108 may comprise general purpose, portable computing devices (such as a smartphone and a tablet) that use client applications 110 and 112 to perform operations associated with a conventional point-of-sale terminal, such as processing credit and debit card payments. In this example, operators 102 and 104 may comprise resource providers (e.g., merchants) that provide goods or services to customers in exchange for payment.

The operations performed by the client applications 110 and 112 may include, for example, the secure transmission of messages to the application server 114. As an example, a message may comprise payment information, such as a payment account number (PAN) used to authorize a transaction between a resource provider operator and a customer. As another example, a message may comprise login information, used by the application server 114 to authenticate the computer systems 106 and 108 before providing services to the computer systems 106 and 108 (e.g., services associated with point-of-sale systems, account management services, etc.).

The computer systems 106 and 108 can use cryptography in order to securely transmit messages, e.g., by encrypting those messages. Each computer system may use a particular cryptographic protocol in order to encrypt messages transmitted to the application server 114. Computer systems 106 and 108 may use the same cryptographic protocol or may use different cryptographic protocols. The computer systems 106 and 108 may use different cryptographic protocols based on the particular cryptographic needs or wants of their corresponding operators, or based on hardware properties or limitations of the computer systems. For example, computer system 106 may frequently transmit messages with relatively low security requirements (e.g., location data, used in a navigation related client application 110), while computer system 108 may infrequently transmit messages with high security requirements (e.g., medical records, used in a health care related client application 112). As such, operator 102 may prefer a cryptographic protocol that is fast, even if it sacrifices some cryptographic security, and operator 104 may prefer a cryptographic protocol that is secure, even if it sacrifices some processing speed.

Computer systems 106 and 108 may each store a respective computer system protocol file (e.g., protocol files 120 and 122), which may define the cryptographic protocol used by the corresponding computer system. Protocol files 120 and 122 may be integrated into client applications 110 and 112 or may exist separately. The cryptographic protocol file may identify one or more cryptographic software modules (e.g., cryptographic software modules 128 and 130) used to generate the session keys used to encrypt messages. The protocol files 120 and 122 may be modified to change the cryptographic software modules used to generate the session key, as described below in Section V. This may occur if, for example, one or more cryptographic software modules 128 and 130 have been found to be insecure. Alternatively, the cryptographic protocol may be modified based on operator needs. For example, if the message throughput of computer system 108 increases, operator 104 may desire a faster cryptographic protocol in order to accommodate the increased rate of message transmission.

The cryptographic software modules 128 and 130 identified by protocol files 120 and 122 may comprise code, such as interpretive code (e.g., written in a language such as JavaScript) used to perform cryptographic operations. The cryptographic software modules 128 and 130 may have been transmitted to the computer systems 106 and 108 by the application server 114 during a registration phase (e.g., as described below in Section III). Additionally, the cryptographic software modules 128 and 130 may be digitally signed by the application server 114 or a certificate authority. A digital signature may attest that the signed cryptographic software module is legitimate. The computer systems 106 and 108 may include or otherwise store cryptographic software module libraries 124 and 126 to store cryptographic software modules 128 and 130. In some embodiments, the computer systems 106 and 108 may comprise a trusted execution environment (TEE) that stores these cryptographic software module libraries 124 and 126. In some embodiments, the cryptographic software modules 128 and 130 may be signed by a trusted execution environment manufacturer.

As stated above, the application server 114 may provide computational resources used by client applications 110 and 112 to perform operations associated with the intended function of computer systems 106 and 108 (e.g., point-of-sale operations). These operators may include receiving encrypted messages from computer systems (including computer systems 106 and 108), and decrypting those messages in accordance with the cryptographic protocol(s) used by those computer systems (e.g., the cryptographic protocols defined by protocol files 120 and 122). The application server 114 may maintain an operator database 116, which may contain database entries comprising information corresponding to each operator or each operator's account with the service provided by the application server 114. The operator database 116 may comprise part of an identity management system that creates, manages, and deletes user (e.g., operator) access to system resources. Database entries in operator database 116 may comprise server computer protocol files (e.g., protocol files 138 and 140). These server computer protocol files 138 and 140 may comprise information used to identify or define the cryptographic protocol used by the corresponding computer system (e.g., as defined by that computer system's computer system protocol file described above).

In order to decrypt messages received from computer systems 106 and 108, the application server 114 may communicate with a cryptography server 118. The cryptography server 118 may comprise specialized hardware or execute specialized code associated with cryptography. For example, the cryptography server 118 may include one or more hardware security modules (HSMs), used to store cryptographic keys or perform cryptographic functions such as key generation, cryptographically secure cryptographic number generation, etc. The HSMs may include a classical hardware security module 134, used to perform cryptographic operations associated with classical cryptography. The HSMs may also include a post-quantum hardware security module 136, used to perform cryptographic operations associated with post-quantum cryptography, in addition to any number of additional HSMs 142. After identifying the particular cryptographic protocol used to encrypt a message received from one of the computer systems, the application server 114 can communicate with the cryptography server 118 to request decryption of that message, in accordance with the corresponding cryptographic protocol. In some embodiments, the application server 114 and cryptography server 118 may comprise a single server computer entity.

The cryptography server 118 may comprise part of a cloud-based service that provides cryptographic services to the application server 114, including, for example, securely storing cryptographic information (such as cryptographic keys), performing de-encapsulation using de-encapsulation functions, generating shared secrets, generating session keys in accordance with cryptographic protocol files, and generating and verifying digital signatures. Further, the cryptography server 118 can perform functions associated with updating the cryptographic protocol used to encrypt and decrypt messages. The cryptography server 118 can store cryptographic software modules that can be used to generate secret shares. These cryptographic software modules can be stored in HSMs such as classical HSM 134, post-quantum HSM 136, additional HSMs 142, or any other appropriate storage element. The cryptography server 118 can transmit these cryptographic software modules to computer systems (such as computer systems 106 and 108) as part of an update process in order to update the cryptographic protocol used by these computer systems. This transmission can be mediated by application server 114 (e.g., the cryptography server 118 can transmit the cryptographic software modules to application server 114, which can subsequently transmit the cryptographic software modules to computer system 106 and/or 108).

Additionally, the cryptography server 118 can comprise an interface 132. This interface may enable the application server 114 to communicate with the cryptography server 118. The interface 132 may also enable the application server 114 to request services provided by the cryptography server 118 (e.g., decryption of an encrypted message). The interface 132 may comprise one or more application programming interfaces (APIs) that support a layer of abstraction, which can enable applications (such as client applications 110 and 112) to be built in a crypto-agile manner. This can be accomplished by the use of generic, non-specific API functions. Broadly, functions performed by the cryptography server 118 can be designed in such a way that the application server 114 or client applications 110 and 112 do not need to understand or account for the operation of these functions in order to use them. The specifics of these functions are performed by the cryptography server 118, can be changed or otherwise modified without requiring modification of the API functions. As a consequence, even if the functions performed by cryptography server 118 are modified, applications operating on computer systems 106, 108 or application server 114 will not be broken or otherwise invalidated by these modifications, as a result, cryptographic applications can be developed in a more agile and less error-prone manner.

The cryptography server 118 may provide other services, such as vulnerability management, key management, revocation, risk assessment, etc. This can be accomplished by maintaining a policy or policy file 144 related to the security of each cryptographic software module. If a vulnerability, misconfiguration, or mathematical weakness is discovered, then a risk assessment module 146 can determine whether a particular cryptographic software module should be modified or discarded.

II. Overview of Registration, Encryption, and Updating

Figure 2:
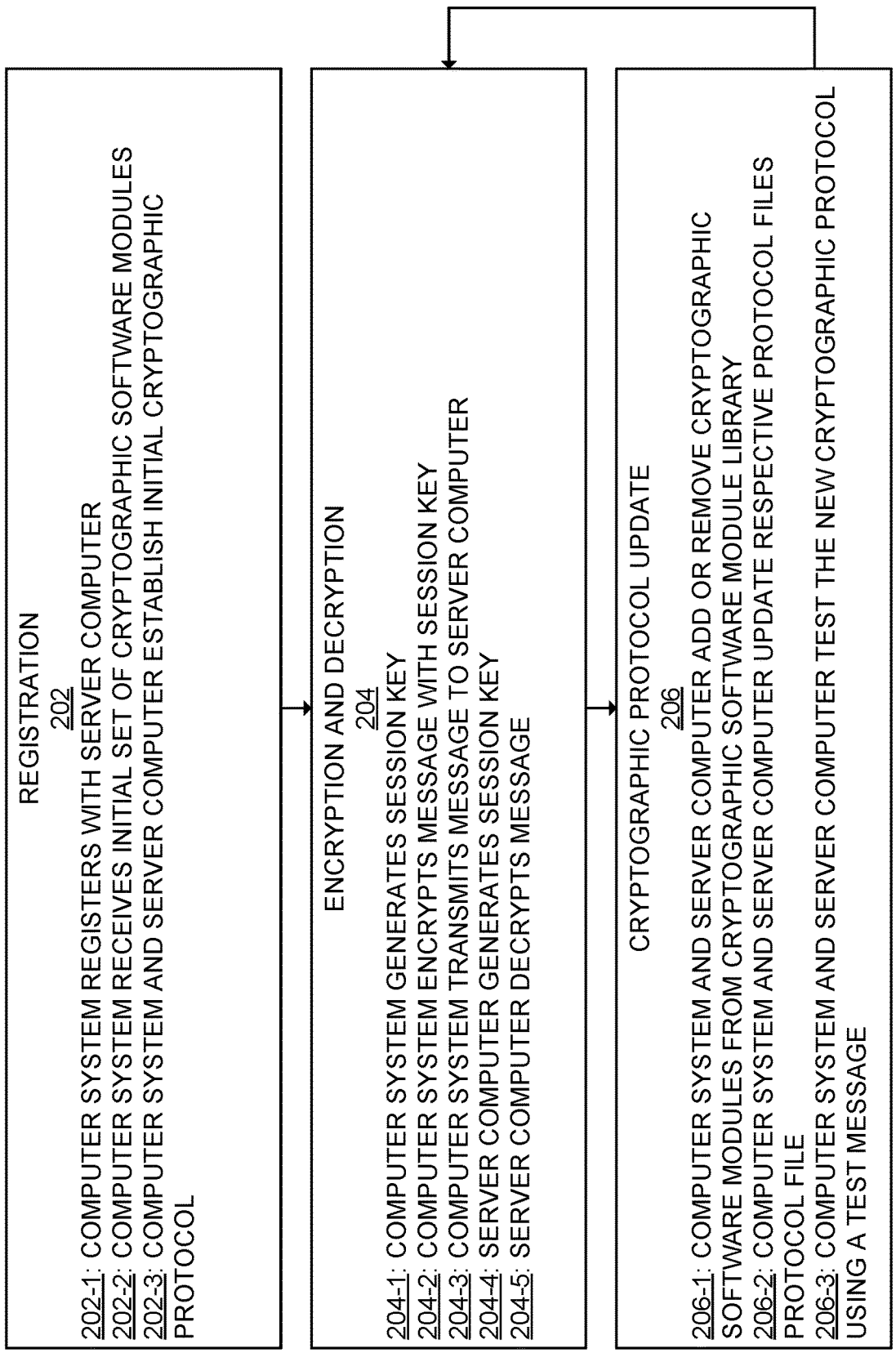
FIG. 2 shows a flowchart corresponding to an overview of methods according to some embodiments.

FIG. 2 shows a flowchart corresponding to an overview of some exemplary methods according to embodiments. The flowchart of FIG. 2 broadly illustrates three phases. The first phase depicted in FIG. 2 is a registration phase 202, during which a computer system can register with the cryptography service provided by a server computer, receive an initial set of cryptographic software modules, and establish the initial cryptographic protocol with the server computer. The second phase depicted in FIG. 2 is an encryption and decryption phase 204, during which the computer system can generate a session key and use the session key to encrypt a message. The computer system can then transmit the encrypted message to the server computer, which can subsequently decrypt the message. The third phase depicted in FIG. 2 is a cryptographic protocol update phase, which can include adding or removing cryptographic software modules, updating the protocol file, and testing the new cryptographic protocol file by encrypting and transmitting a test message, then verifying that the test message was successfully decrypted. FIG. 2 is intended only as a brief summary of some methods according to embodiments, and as such, some embodiments may involve steps or phases not depicted in FIG. 2.

During the registration phase 202, at step 202-1, a computer system (e.g., computer system 106 of FIG. 1) can initiate registration with the cryptography service provided by the server computer (e.g., cryptography server 118). Initiating registration can involve, for example, an operator of the computer system using the computer system to navigate to a webpage associated with the server computer. This webpage may include a form, which the operator can fill out in order to complete the registration process. The form can include fields such as a computer identifier field, a desired username and password field, an email address field, etc. As another example, the computer system can initiate registration by transmitting a request message to the server computer, containing a computer system identifier or other credentials (such as a username and password) as well as a flag indicating that the computer system intends to register with the cryptography service. After an initial registering step, at step 202-2 the computer system can receiving an initial set of cryptographic software modules. As examples, the initial set of modules can be transmitted directly from the server computer or obtained by a third party provider, e.g., in response to a link provided by the server computer. Afterwards, at step 202-3, the computer system and server computer can establish an initial cryptographic protocol by exchanging a series of messages during a negotiation phase. The registration phase 202 is described in more detail below in Section III.

During the encryption and decryption phase 204, at step 204-1, the computer system can use the initial cryptographic protocol to generate a session key. This session key can be used at step 204-2 to encrypt a message intended for the server computer. Subsequently at step 204-3, the computer system can transmit the encrypted message to the server computer, additionally at step 204-3, the computer system can transmit one or more encapsulations to the server computer. At step 204-4 the server computer can generate a corresponding session key. In some embodiments, the server computer can de-encapsulate one or more encapsulations to generate one or more secret shares, which the server computer can then combine to generate the session key. At step 204-5 the server computer can decrypt the message using the session key. Encryption and decryption phase 204 is described in more detail below in Section IV.

During the cryptographic protocol update phase 06, the computer system and server computer can perform a variety of operations associated with updating the cryptographic protocol. For example, at step 206-1, the computer system and server computer can add or remove cryptographic software modules from the cryptographic software module library on the computer system. Additionally, at step 206-2 the computer system and server computer can update their respective protocol files to reflect the changes in the cryptographic software module libraries. At step 206-3, the computer system and server computer can test the new cryptographic protocol by encrypting and transmitting a test message, then verifying that the test message was successfully decrypted. The cryptographic protocol update phase is described in more detail below in Section V. Afterwards, the computer system and server computer can return to the encryption and decryption phase 204. The computer system can then use the new cryptographic protocol to encrypt messages sent to the server computer. Likewise, the server computer can use the new cryptographic protocol to decrypt messages sent by the computer system. Encrypting and transmitting messages using the updated cryptographic protocol is described in more detail below in Section VI.

III. Registration

The registration phase can involve the computer system receiving software used to securely communicate with the server computer (e.g., an application server). This may include receiving one or more client applications that can be operated by the computer system. It may also include receiving one or more cryptographic software modules that can be used to generate session keys, which can be used to encrypt messages sent to the server computer (e.g., messages containing sensitive information, such as medical records or payment information). The registration phase may further comprise the computer system and the server computer negotiating the initial cryptographic protocol used to generate session keys and encrypt and decrypt messages. After negotiating the cryptographic protocol, the computer system can modify or generate a computer system protocol file to identify one or more software modules used to generate the session key. Likewise, the server computer can modify or generate a corresponding server computer protocol file to identify the one or more software modules used to generate the session key. The server computer can use this server computer protocol file to decrypt encrypted messages transmitted by the computer system during an encryption and decryption phase (e.g., as described below in Section IV).

Figure 3:
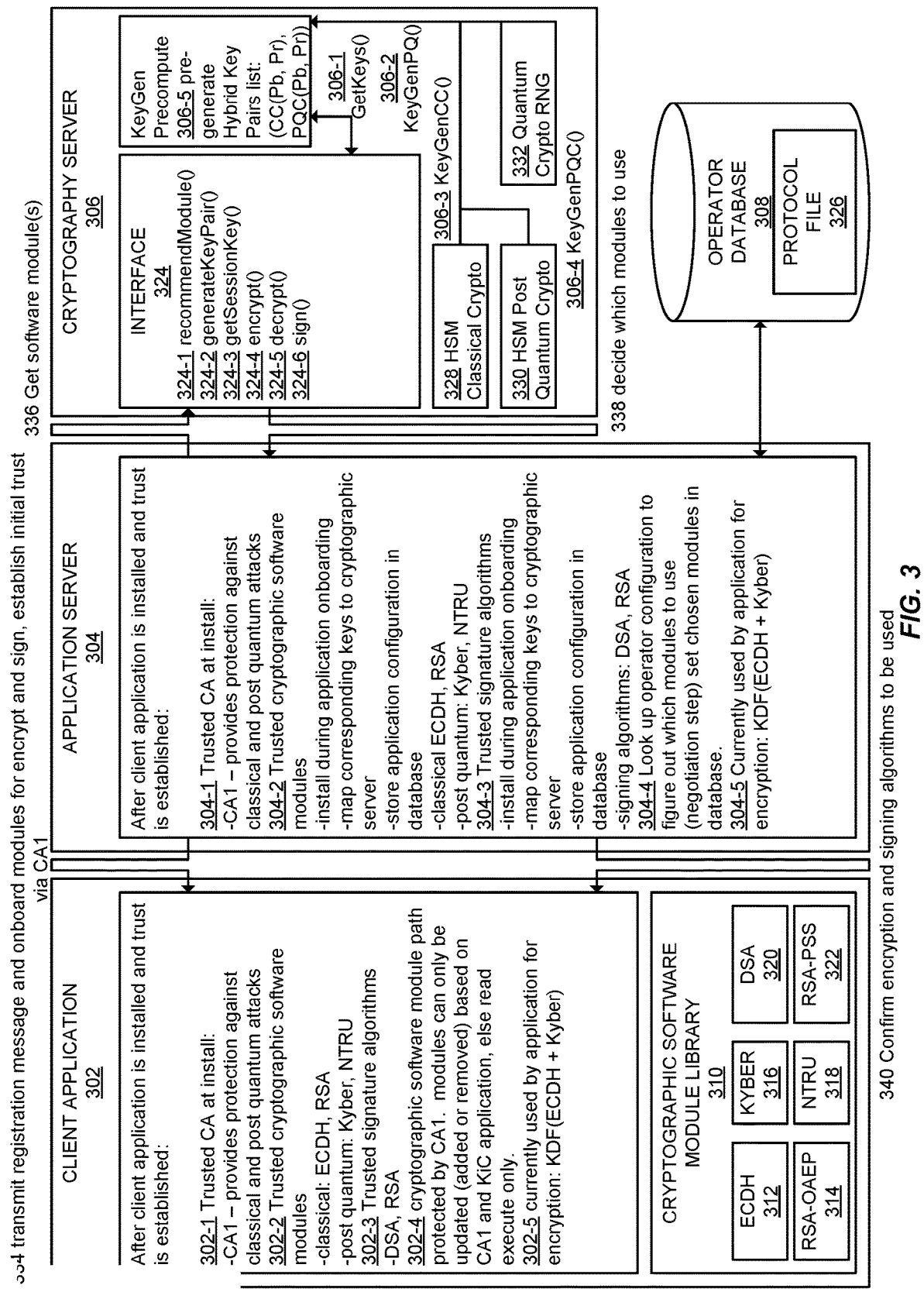
FIG. 3 shows a system diagram corresponding to a registration process according to some embodiments.

FIG. 3 shows an exemplary system diagram according to some embodiments. FIG. 3 includes a client application 302 (operating on a computer system), an application server 304, a cryptography server 306, and an operator database 308. In some embodiments, the application server 304 and cryptography server 306 may comprise a single server computer. Client application 302 can comprise a thin application, and can, for example, be constrained to relatively low memory usage and processing power requirements.

In some embodiments, the registration process involves the installation of the client application 302 on a computer system. In others, it is assumed that the client application 302 has already been installed on the computer system prior to registration. For example, the client application 302 may have been installed manually by the operator of the computer system. The application server 304 can facilitate the installation process by transmitting the client application 302 to the computer system. Alternatively, the application server 304 can transmit a software development kit (SDK) to the computer system, enabling the operator of the computer system to use the SDK to include cryptographic functionality into their own client application 302 (e.g., a client application developed and produced by the operator of the computer system).

The client application 302 or SDK can include a cryptographic software module library 310, comprising one or more cryptographic software modules. FIG. 3 shows six cryptographic software modules, an ECDH module 312, an RSA-OAEP module 314, a Kyber module 316, a NTRU module 318, a DSA module 320, and an RSA-PSS module 322. These cryptographic software modules can each correspond to the cryptosystems with the corresponding name. For example, the ECDH module 312 can correspond to the elliptic curve Diffie-Hellman cryptosystem, and can be used to perform cryptographic operations associated with that cryptosystem. It should be understood that embodiments of the present disclosure can be practiced with any number and combination of cryptographic software modules, and are not limited to those depicted in FIG. 3. The cryptographic software modules in FIG. 3 are intended only to provide an example. Of further note, the client application 302 may not possess cryptographic software modules 312-322 prior to the registration phase, and may be provisioned cryptographic software modules 312-322 during the registration phase.

The cryptographic software modules can be signed with digital signatures backed by a digital certificate issued by a certificate authority. In FIG. 3, this certificate authority is designated CA1. (CA1, described in more detail below). These digital signatures can be resistant to both classical forgery and post-quantum forgery. As such, if the client application 302 or the operator of the computer system trusts CA1, it can likewise trust that the signed cryptographic software modules originated from the server computer and/or the cryptography server 306. As a security measure, the cryptographic software module library 310 can be programmed or configured such that only modules with valid signatures can be included in the library, otherwise, the modules in the cryptographic software module library 310 are read and execute only.

At step 334, after the client application 302 has been installed, the client application 302 can initiate the registration process by transmitting a registration message to the application server 304. In addition to indicating that the client application 302 intends to register with the application server, the registration message (or any subsequent messages) can include any information necessary for the registration process, such as a computer system identifier or identifying information corresponding to the operator of the computer system (e.g., name, email address, etc.). The application server 305 can create a database entry in operator database 308 containing any information included in the registration message or any subsequent messages received from the client application. Additionally at step 334, the client application 302 and application server 304 can establish trust via a certificate authority CA1. This process may involve, for example, the client application 302 and application server 304 (or their respective operators) verifying that CA1 is a legitimate and trustworthy certificate authority. CA1 can back digital signatures included in cryptographic software modules, enabling the client application 302 to trust that those cryptographic software modules are legitimated. After exchanging and evaluating information in the registration message and establishing trust in CA1, the client application 302 and application server 304 can begin the process of onboarding the cryptographic software modules used for encryption and signing.

Afterwards, at step 336, the application server 304 can interface with the cryptography server 306 to retrieve cryptographic software modules which can be used by the client application 302 to generate session keys and encrypt messages. The application server 304 may retrieve these cryptographic software modules from the cryptography server 306 using the cryptography server interface 324. This interface 324 may comprise an API that exposes functions to the application server 304, such as a recommendModule( ) function 324-1, a generateKeyPair( ) function 324-2, a getSessionKey( ) function 324-3, an encrypt( ) function 324-4, a decrypt( ) function 324-5, and a sign( ) function 324-6. The interface 324 may expose other any number of other functions (not pictured) which may relate to cryptographic operations and which may be used by the application server 304 during its operation. These may include, for example, functions associated with such as risk management, such as functions that enable the application server to evaluate the risk associated with the use of particular cryptographic software modules, functions used to perform key revocation, etc. Notably, not all of the functions described may be used during the registration phase. Some or all of these functions may be used in later phases, such as an encryption and decryption phase, as described in Section II above with reference to FIG. 2. A function such as getSessionKey( ) 324-3 for example, may be used in an encryption and decryption phase, but may not be necessary during the registration phase.

The recommendModule( ) function 324-1 may be used during the registration phase or the cryptographic protocol update phase (as described in Section V) to identify or otherwise determine one or more cryptographic software modules that can be used to implement the cryptographic communication protocol used to securely transmit messages from the client application 302 to the application server 304. These cryptographic software modules may be determined, in part, based off the performance capabilities and security requirements of the computer system operating the client application 302, based on operator preferences, etc. For example, if the client application 302 is operating on a computer system with a particular memory limitation (e.g., less than 1 GB RAM), the application server 304 can use recommendModule( ) function 324-1 to pass arguments including the amount of memory available to the client application 302 to the cryptography server 306. The cryptography server 306 can use these memory limitations to identify cryptographic software modules that could be operated by the client application 302.

The generateKeyPair( ) function 324-2 can be used to generate asymmetric key pairs, comprising public keys and private keys. The generateKeyPair( ) function 324-2 can return the public keys to the application server 304, which can subsequently provide the public keys to the client application 302. The public and private keys can be used in a variety of applicable cryptographic contexts, for example, these public keys may be used by cryptographic software modules in the cryptographic software module library 310 in order to perform cryptographic operations such as encryption, decryption, generating a session key, etc.

The getSessionKey( ) function 324-3 can be used by the cryptography server 306 to generate a session key used to encrypt and decrypt messages sent between the client application 302 and the application server 304. The getSessionKey( ) function 324-3 can use a key derivation function and one or more secret shares to generate a session key. As an alternative, the getSessionKey( ) function 324-3 can use one or more encapsulations (e.g., received from a computer system during an encryption and decryption process, as described below in Section IV. A with reference to FIG. 4) as inputs, use a de-encapsulation function to generate one or more secret shares and generate the session key using a key derivation function and the de-encapsulated secret shares. The session key can either be held in memory or returned to the application server 304 to encrypt and decrypt messages.

The encrypt( ) function 324-4, can be used by the application server 304 to request encryption of data (e.g., a message) using a specified key, such as a generated session key. The application server 304 can identify the specified key using a key identifier, which can identify a particular public key, private key, or session key stored by the cryptography server 306. The cryptography server 306 may store this key in any appropriate hardware security module, such as hardware security modules 328 or 330. The cryptography server 306 can retrieve the specified key, then use the specified key to encrypt the provided data.

Likewise the decrypt( ) function 324-5 can be used by the application server 304 to request decryption of data (e.g., an encrypted message) using a specified key. The application server 304 can identify the specified key using a key identifier, which can identify a particular public key, private key, or session key stored by the cryptography server 306. The cryptography server 306 may store this key in any appropriate hardware security module, such as hardware security modules 328 or 330. The cryptography server 306 can retrieve the specified key, then use the specified key to decrypt the provided data.

The sign( ) function 324-6 can be used by the application server 304 to request generation of a digital signature corresponding to data (e.g., a message). This can be accomplished in a variety of ways. As one example, the application server 304 can use the sign( ) function 324-6 to provide the data to the cryptography server 306. The cryptography server 306 can retrieve a signing key (e.g., from hardware security module 328 or 330) and use the signing key to generate a digital signature. The cryptography server 306 can subsequently return the digital signature to the application server 304.

The cryptographic keys corresponding to cryptographic software modules (e.g., cryptographic software modules 312-322) provided by the cryptography server 306 may be stored in one or more of the hardware security modules (HSMs) associated with the cryptography server 306. For example, cryptographic software modules associated with classical cryptosystem can be stored in a hardware security module for classical cryptography 328. Likewise, cryptographic software modules associated with post-quantum cryptographic can be stored in a hardware security module for post quantum cryptography 330. Additionally, the cryptography server 306 may comprise any number of other hardware security modules, such as hardware security modules associated with theoretical "post-post-quantum" cryptography.

The hardware security modules may store cryptographic keys and cryptographic functions used by the cryptography server 306. These may include key generation functions, such as a classical key generation algorithm (KeyGenCC( )) 306-3 used to generate classical cryptographic keys, as well as a post-quantum key generation algorithm (KeyGenPQC( )) 306-4. The cryptography server 306 may precompute these cryptographic keys prior to the registration process using a KeyGen Precompute function 306-5. The KeyGen Precompute function 306-5 can call the KeyGenCC( ) 306-3 and KeyGenPQC( ) 306-4 in order to precompute the cryptography keys. The KeyGen Precompute function 306-5 can also access a quantum cryptographic RNG module 332 using a KeyGenPQ( ) function 306-2 in order to generate high-entropy random numbers based on properties of quantum physics. These random numbers can be used as the input to the key generation functions, e.g., as a seed value or a nonce. The cryptography server 306 may comprise any number of additional random number generators, e.g., to provide security against other forms of attack. The cryptography server interface 324 can call a GetKeys( ) function 306-1, in order to either retrieve any number of cryptographic keys from their respective hardware security modules or initiate the generation of any number of cryptographic keys.

At step 338, the cryptography server 306 can decide which cryptographic software modules to use as part of the initial cryptographic protocol (using, for example, the recommendModule( ) function 324-1) and return those cryptographic software modules to the application server 304, enabling the application server 304 to transmit the cryptographic software modules to the client application 302. The client application 320 can then store the cryptographic software modules in its cryptographic software module library 310.

In the exemplary system of FIG. 3, the cryptographic software modules stored in the cryptographic software module library 310 can include two classical cryptographic modules (an ECDH module 312 and an RSA-OAEP module 314), as well as two post-quantum cryptographic modules (a Kyber module 316 and an NTRU module 318). The cryptographic software modules can also include two signing modules: a DSA module 320 and an RSA-PSS module 322. These cryptographic software modules may comprise functions associated with their underlying cryptosystems (e.g., key generation algorithms). They may store or otherwise comprise cryptographic keys corresponding to these cryptosystems.

The application server 304 may establish a mapping between the client application 302, the hardware security modules, and cryptographic keys, using, for example, one or more client application identifiers, computer system identifiers, HSM identifiers, and cryptographic key identifiers. This mapping may be established and stored in the operator database 308. The application server 304 may also establish mappings between the cryptographic keys, the client application 302, and the cryptography server 306 for the cryptographic software modules used for digital signature generation, and store those mappings in the operator database 308.

At step 340, after installing the client application 302 on the computer system and onboarding the cryptographic software modules, the client application 302 and application server 304 can negotiate the initial cryptographic protocol to use. In some embodiments, there may be a default cryptographic protocol established during the installation process. In others, the client application 302 may communicate with the application server 304 to establish the cryptographic protocol. These communications may include, for example, system information or system parameters corresponding to the computer system (e.g., detailing the cryptographic capabilities or limitations of the computer system). In the example of FIG. 3, as indicated by label 302-5, the client application 302 and application server 304 have established a cryptographic protocol that includes deriving a cryptographic session key using a key derivation function KDF( ), the ECDH software module 312, and the Kyber software module 316. The cryptographic protocol can be defined by a computer system protocol file (not pictured) and a corresponding server computer protocol file 326. The computer system protocol file can be stored locally on the computer system running client application 302. The server computer protocol file 326 can be stored in the operator database 308.

Labels 302-1 to 302-5 summarize some steps performed by the client application 302 during the registration process. After the client application 302 is installed, as indicated by label 302-1, the client application 302 and application server 304 can establish trust in a certificate authority CA1, which provides protection against classical and post-quantum attacks. Next, at label 302-2, the client application 302 can receive the trusted cryptographic software modules from the application server 304, including, for example, an ECDH module 312, an RSA-OAEP module 314, a Kyber module 316, and an NTRU module 318. The client application 302 can store these modules in the cryptographic software module library 310. Similarly, at label 302-3, the client application 302 can receive the trusted signature modules, including a DSA module 320 and an RSA-PSS module 322. The client application 302 can store these modules in the cryptographic software module library 310. As indicated by label 302-4, the file path to these cryptographic software modules in the cryptographic software module library is protected by CA1. That is, modules can only be added or removed with a valid CA1-backed signature, otherwise these modules are read and execute only. At label 302-5, the client application 302 and application server 304 can establish the initial cryptographic protocol used for encryption and decryption. In FIG. 3, this initial cryptographic protocol involves generate a cryptographic key using the ECDH module 312 and the Kyber module 316.

Labels 304-1 to 304-5 summarize some steps performed by the application server 304 during the registration process. After the client application 302 is installed, at label 304-1, the client application 302 and application server 304 establish trust in a certificate authority CA1, which provides protection against classical and post-quantum attacks. Next, at label 304-2, the application server 304 retrieves the trusted cryptographic software modules from the cryptography server 306 and pushes these modules to the client application 302 in an onboarding installation process. The application server 304 also creates an entry (an "application configuration") in operator database 308 that includes a mapping between the cryptographic software modules, the client application 302 and their corresponding cryptographic keys stored in the hardware security modules in the cryptography server 306. This mapping can be established using a device or computer system identifier corresponding to the computer system operating client application 302. In FIG. 3, these trusted cryptographic software modules comprise an ECDH module 312, an RSA-OAEP module 314, a Kyber module 316, and a NTRU module 318. At label 304-3, the application server 304 can perform a similar series of steps involving the signing modules used by the client application 302, including the DSA module 320 and the RSA-PSS module 322.

At label 304-4, the application server 304 and client application 302 can negotiate the initial cryptographic protocol. The application server 304 can access the operator database 308 in order to associate a protocol file 326 with the operator configuration corresponding to the client application. Using information contained in the operator configuration (e.g., system requirements or capabilities), the application server 304 can determine which cryptographic software modules to use in the initial cryptographic protocol. As indicated by label 304-5, the negotiated cryptographic protocol comprises using the ECDH module 312 and the Kyber module 316 to generate the cryptographic key used for encryption and decryption.

IV. Encryption and Decryption

After the computer system and server computer establish an initial cryptographic protocol during the registration process, the cryptographic protocol can be used for encrypting and decrypting messages sent between the computers. A sequence diagram (FIG. 4) and a system diagram (FIG. 5) are described below in order to illustrate such encryption and decryption operations.

A. Encryption and Decryption Sequence Diagram

Figure 4:
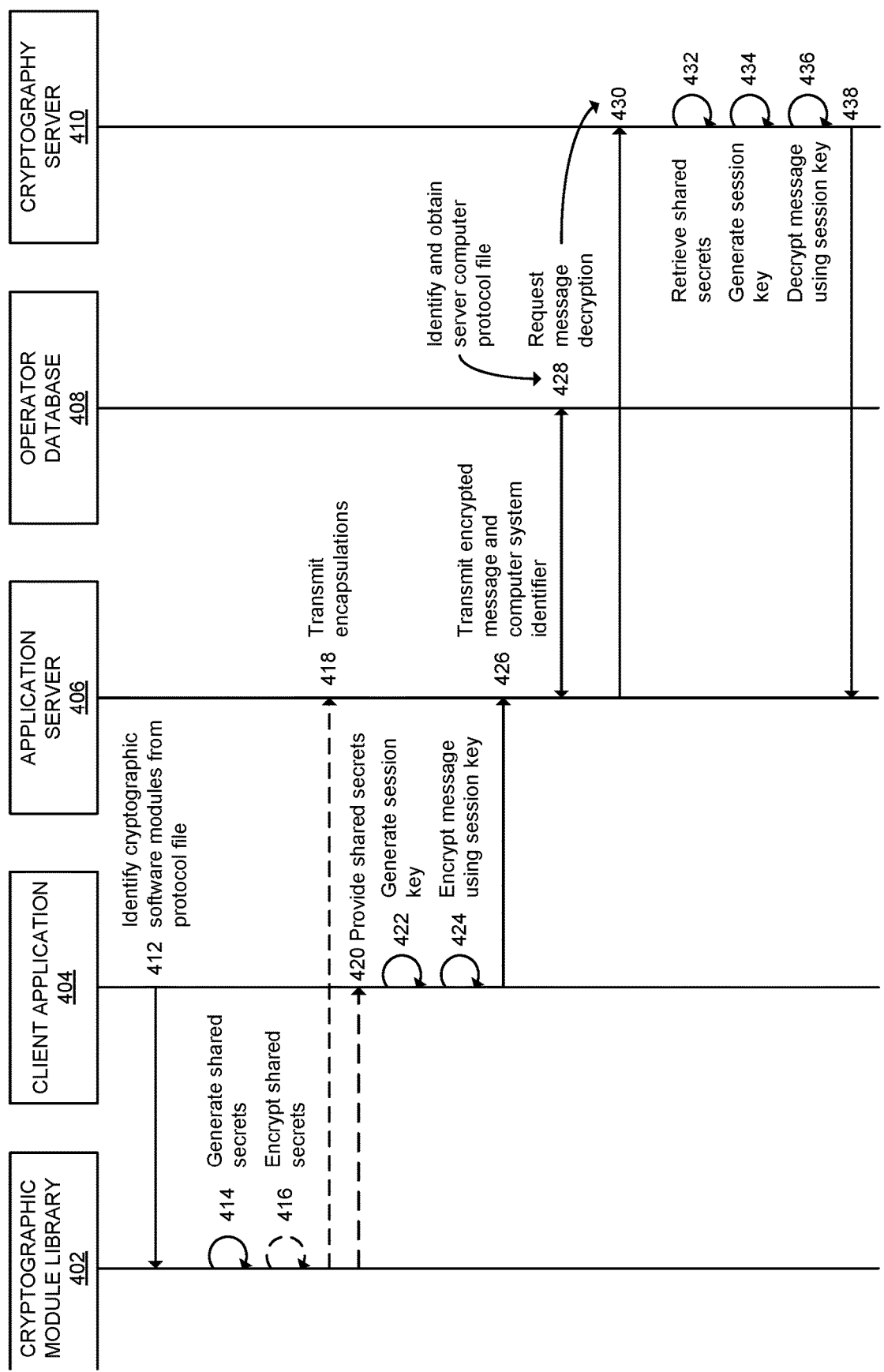
FIG. 4 shows a sequence diagram of a secure communication process according to some embodiments.

FIG. 4 shows a sequence diagram of an exemplary encryption and decryption process according to some embodiments. A computer system operating a client application 404 may possess a message that the client application 404 intends to securely transmit to a server computer (which can comprise, for example, the application server 406 or a combination of the application server 406 and cryptography server 410). In some embodiments, the message may comprise a credential used to authorize an interaction (e.g., a payment transaction) between a user (e.g., a customer) of a user device (e.g., a smartphone) and a resource provider operator (e.g., a merchant) of the computer system operating the client application 404. The computer system may receive this credential from the user device, for example, via near-field communication or another appropriate communication protocol. As another example, the message may comprise login information used by the client application 404 to log into a service provided by the application server 406 (e.g., a cloud-based point of sale service, a video streaming service, a data hosting service, etc.).

At step 412, the client application 404 may identify one or more cryptographic software modules based on a computer system protocol file. This computer system protocol file may define the cryptographic protocol used by the client application 404 to encrypt messages. The computer system protocol file may identify one or more cryptographic software modules used to generate a session key that can be used to encrypt the message. These cryptographic software modules may comprise a subset of cryptographic software modules stored in a cryptographic module library 402. These cryptographic software modules may each correspond to an underlying cryptosystem, e.g., one cryptographic software module may correspond to the RSA cryptosystem, whereas another cryptographic software module may correspond to the Kyber cryptosystem. These cryptographic software modules may comprise cryptographic data (such as cryptographic keys) as well as functions associated with cryptography (such as key generation functions or secret share generation functions). Although FIG. 4 shows certain steps performed by the cryptographic module library 402 and certain steps performed by the client application 404, these steps can be performed by either and/or both of these software entities.

In order to securely communicate shared secrets, which can subsequently be used to generate the session key, the computer system operating the client application 404 may use a key encapsulation mechanism (KEM) or other encapsulation techniques in steps 414 and 416. At step 414, the computer system may use the client application 404 and cryptographic software modules from cryptographic module library 402 to generate one or more shared secrets corresponding to the one or more cryptographic software modules. These shared secrets can be generated using functions implemented by the cryptographic software modules, and can later be used by the computer system as the input to a key derivation function, in order to generate the session key used to encrypt the message.

At step 416, in some embodiments, each shared secret can be encrypted using a public key. The corresponding private key may be known by the application server 406 or the cryptography server 410, enabling one or both of these servers to decrypt the encrypted shared secrets using the corresponding private key. This key encapsulation mechanism (comprising steps 414 and 416) may enable the secret shares to be securely transmitted over insecure computer networks, and may enable the application server 406 or the cryptography server 410 to generate the session key using the key derivation function and the shared secrets, further enabling the application server 406 or the cryptography server 410 to decrypt the message using the session key.

Subsequently, at step 418, the computer system operating the client application 404 can transmit the one or more encapsulations to the server computer (e.g., the application server 406 and cryptography server 410) Later, at step 432, the cryptography server 410 can de-encapsulate the encapsulations to produce the shared secrets. As described above, these shared secrets can be used at step 432 to generate the session key used to decrypt the message.

At step 420, the shared secrets generated by the cryptographic software modules in the cryptographic module library 402 can be provided to the client application 404. Subsequently, the client application 404 can use these shared secrets to generate a session key used to encrypt the message. Alternatively, in some embodiments, the key derivation function KDF( ) may be part of the cryptographic module library 402. In these embodiments, the session key may be generated in the cryptographic module library 402, rather than by client application 404. Thus, step 420 is optional.

At step 422, the computer system operating the client application 404 can generate a session key using a key derivation function and the one or more shared secrets. The key derivation function may be stored in the cryptographic module library 402, in the client application 404, or elsewhere in the memory of the computer system. This session key can be used to encrypt the message. As a result, the session key (and by extension the encrypted message) is as secure as the underlying cryptosystems used to generate the secret shares used to generated the session key. If, for example, the session key was generated using two secret shares, one corresponding to a classical cryptography software module and the other corresponding to a post-quantum cryptographic software module, the session key (and encrypted message) will be resistant to both classical and post-quantum cryptographic attacks. The computer system can also generate a session signing key using a key derivation function and one or more shared secrets. This session signing key can be used to digitally sign the encrypted message, enabling the application server 406 to verify that the message originated from the client application 404.

At step 424, the computer system operating the client application 404 can encrypt the message using the session key, generating an encrypted message in the process. The computer system operating the client application 404 can generate a message packet comprising the encrypted message, a computer system identifier, and any other relevant information (e.g., a timestamp, metadata, header information, etc.). The computer system identifier can be used by the application server 406 to identify the cryptographic protocol used to encrypt the message. The computer system operating the client application 404 can also generate a digital signature by signing the message packet using the session signing key, or using a private key corresponding to the computer system operating the client application 404. Later, the server computer can verify the digital signature after receiving the message packet.

At step 426, the computer system operating the client application 404 can transmit the message packet comprising the encrypted message and the computer system identifier to the server computer (e.g., the application server 406), this transmission can occur over an unsecured network such as the Internet, or over any other appropriate network or via any other appropriate means.

At step 428, the application server 406 can identify and obtain a server computer protocol file based on the computer system identifier received in the message packet at step 426. The server computer protocol file may identify the cryptographic protocol and corresponding cryptographic software modules used to encrypt the message. In some embodiments, the server computer protocol file may comprise a database entry stored in a protocol file database (e.g., operator database 408). This database entry may additionally comprise a public key corresponding to the computer system operating the client application 404. If applicable, the application server 406 can use the public key to verify a digital signature included in the message packet, in order to verify the client application 404. In addition, the database entry can comprise a key identifier. The key identifier may identify a secret key corresponding to the public key used to perform the key encapsulation mechanism (e.g., at step 416). This secret key may be stored in a hardware security module on the cryptography server 410. The operator database (sometimes referred to as a protocol file database) 408 may store one or more protocol files corresponding to one or more computer systems, enabling different computer systems to use different cryptographic protocols.

At step 430, the application server 406 can communicate with the cryptography server 410 in order to generate the shared secrets and the session key used to decrypt the encrypted message. In some embodiments, the application server 406 may request message decryption using an API or other suitable interface provided by the cryptography server. The communication from the application server 406 may comprise, for example, transmitting the encapsulations and a key identifier to the cryptography server 410. The cryptography server 410 can use the key identifier to identify and retrieve cryptographic keys that can be used to de-encapsulate the shared secrets.

At step 432, the cryptography server 410 can generate or otherwise retrieve the one or more shared secrets corresponding to the server computer protocol file. These shared secrets may later be used by the cryptography server to generate the session key used to decrypt the message. In some embodiments, the cryptographic server 410 can produce the one or more shared secrets by de-encapsulating the encapsulations received from the application server 406 at step 430, e.g., by decrypting the encapsulations using their corresponding private keys.

In some other embodiments, the cryptography server 410 may locally generate the shared secrets, using a process similar to the process used by the client application 402. The cryptography server 410 may store the one or more cryptographic software modules locally, enabling the cryptography server 410 to generate the one or more shared secrets. Alternatively, the cryptography server 410 may already possess and have stored the one or more shared secrets, for example, in a hardware security module. As another alternative, the cryptography server 410 may have precomputed and stored the session key (e.g., in a hardware security module). As such, steps 432 and 434 may be optional.

At step 434, the cryptography server 410 can generate a session key using a key derivation function and the one or more shared secrets. The cryptography server 410 can also generate a session signing key (using the same key derivation function or a similar key derivation function) in order to verify a digital signature included in the message packet.

At step 436, the cryptography server 410 can decrypt the encrypted message using the session key to retrieve the message. Additionally, the cryptography server 410 can use the session signing key to verify the digital signature included in the message packet.

At step 438, the cryptography server 410 can transmit the decrypted message back to the application server 406. The application server 406 can then use the decrypted message based on the particular purpose or application of the application server 406. For example, if the application server 406 is used to control access to computational resources provided by the application server 406, the application server 406 can use the message to validate the client application 404 and enable it to access those computational resources. As another example, if the application server 406 is used to process payment transactions, the application server 406 could extract payment information from the decrypted message, then forward that payment information to a bank or other entity, in order to request authorization for a transaction.

As an alternative to step 438, the cryptographic server 410 can transmit the session key to the application server 406. The application server 406 can decrypt the encrypted message using the session key to retrieve the message (instead of the message being decrypted by the cryptography server 410, as described above).

B. Encryption and Decryption System Diagram

Figure 5:
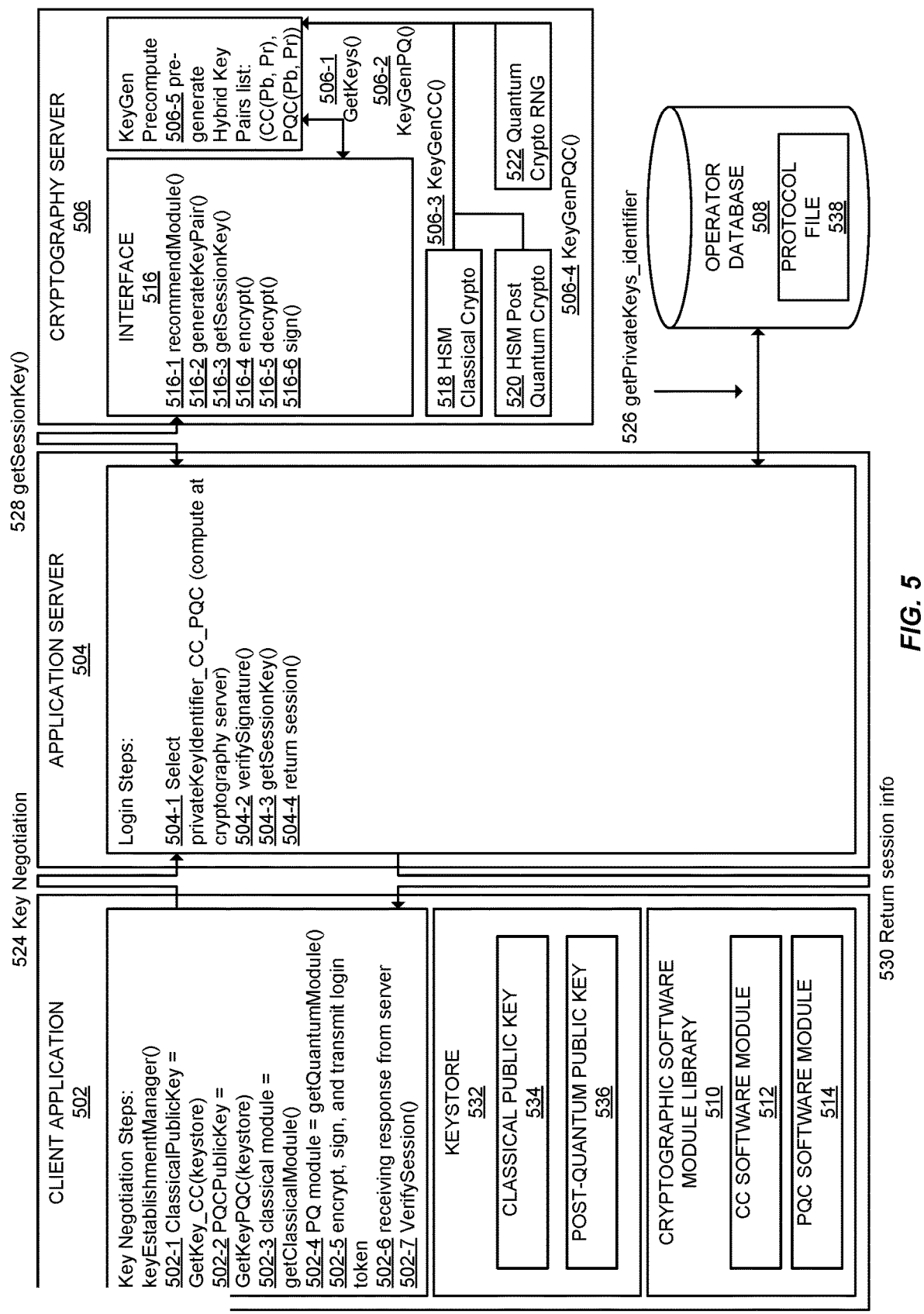
FIG. 5 shows a system diagram of a secure communication process according to some embodiments.

FIG. 5 shows an exemplary system diagram detailing an encryption and decryption process that can be used by a client application 502 and an application server 504. In the example of FIG. 5, the cryptographic protocol involves deriving a cryptographic session key using a hybrid key derivation function based on a classical cryptographic (CC) software module 512 and a post-quantum cryptographic (PQC) software module 514. These software modules can be stored in a cryptographic software module library 510, located on a computer system operating the client application 502. Alternatively, cryptographic keys corresponding to these modules can be stored in a keystore 532 (such as a secure element, or the Android Keystore on Android platforms). This cryptographic session key can be used to encrypt a login token that is subsequently transmitted to the application server 504. Using the cryptography server 506 and the operator database 508, the application server 504 can decrypt the login token and authenticate the client application 502, allowing the client application 502 to access resources provided by the application server 504.

At step 524, as part of the key negotiation process, the client application 502 can invoke a keyEstablishmentManager( ) function, which can be used to perform several steps associated with the encryption process, including steps 502-1 to 502-7. At step 502-1, the client application 502 can retrieve the classical public key 534 from the keystore 532 using a GetKey_CC( ) function. The classical public key may 536 be used with a classical cryptographic software module 512 to generate the session key used to encrypt the login token. At step 502-2, the client application 502 can retrieve the post-quantum public key 536 from the keystore 532 using a GetKeyPQC( ) function. The post-quantum public key 536 can be used with a post-quantum cryptographic software module 514 to generate the session key used to encrypt the login token.

At step 502-3, the client application 502 can retrieve the classical cryptographic software module 512 from the cryptographic software module library 510 using, for example, a getClassicalModule( ) function. At step 502-4, the client application 502 can retrieve the post-quantum cryptographic software module 514 from the cryptographic software module library 510 using, for example, a getQuantumModule( ) function. It should be understood that although these steps specifically reference classical and post-quantum cryptographic keys and software modules, embodiments can be practiced with other types of cryptographic keys and software modules.

The client application 502 can then use the classical public key 534, the post-quantum public key 536, the classical cryptographic software module 512 and the post-quantum cryptographic software module 514 to derive the session key used to encrypt the login token. The client application 502 can do this in accordance with a cryptographic protocol, using methods such as those described above with reference to FIG. 4, e.g., using a key derivation function. This cryptographic protocol may be defined by a computer system protocol file stored on the computer system operating client application 502. At step 502-5, the client application 502 can encrypt, sign, and transmit the login token to the application server 504. The client application 502 can also transmit a computer system identifier that the application server 504 can use to identify the cryptographic protocol used by the client application 502 to encrypt messages. The application server 504 can begin the process of decrypting the login token in order to log the client application 502 into the service provided by the application server 504.

At step 526, the application server 504 can invoke the getPrivateKeys_identifier function using an identifier (such as a computer system identifier associated with the client application 502), in order to identify the private keys needed to generate the hybrid session key used to decrypt the login token, and retrieve these private keys from the operator database 508. At step 504-1, the application server 504 can provide the private key identifier to the cryptography server 506 via interface 516. This step can enable the cryptography server 506 to retrieve the corresponding private keys from their respective hardware security modules (e.g., classical cryptography hardware security module 518 and post-quantum cryptography hardware security module 520).

At step 504-2, the application server 504 can verify the signature included in the signed login token in order to verify that the login token originated from the client application 502 using, for example, a verifySignature( ) function. At step 504-3, the application server 504 can identify the cryptographic protocol used to derive a hybrid session key that can be used to decrypt the login token (using, for example, a protocol file 538 stored in the operator database 508.

At step 528 and 504-3, the application server 504 can call a getSessionKey( ) 516-3 function using the cryptography server interface 516 in order to request the session key. In the exemplary encryption and decryption process of FIG. 5, the application server 504 may provide the cryptography server 506 with two encapsulations corresponding to the classical public key 534 and the post-quantum public key 536, along with one or more key identifiers. The cryptography server 506 can use the key identifiers to identify and retrieve the corresponding private cryptographic keys (from, for example, either of the hardware security modules 518 or 520). The cryptography server 506 can de-encapsulate the encapsulations using the corresponding private keys, then derive the session key using a key derivation function and the de-encapsulated secret shares. The session key can then be returned to the application server 504.

At steps 504-4 and 530, the application server 504 can use the session key to decrypt and verify the login token, in doing so, the application server 504 can verify that the client application 502 and the computer system operating the client application 502 are allowed to access computational resources provided by the application server 504. The application server 504 can then return a session token to the client application 502, which can be used in further communications between the client application 502 and the application server 504.

At step 502-6, the client application 502 can receive the session information, including the session token from the server. At step 506-7 the client application 502 can verify the session token to complete the login process.

V. Updating Cryptographic Protocol

After using a cryptographic protocol to securely transmit messages, it may become desirable or necessary to update the cryptographic protocol. As an example, new developments in computer technology may render one or more of the cryptographic software modules used in the cryptographic protocol insecure. In order to address this security issue, the cryptographic protocol may be updated to remove the insecure cryptographic software modules and add new, secure cryptographic software modules. This update process may comprise three steps: adding or removing cryptographic software modules, updating the cryptographic protocol file, and testing the new cryptographic protocol.

A. Updating Sequence Diagram

Figure 6:
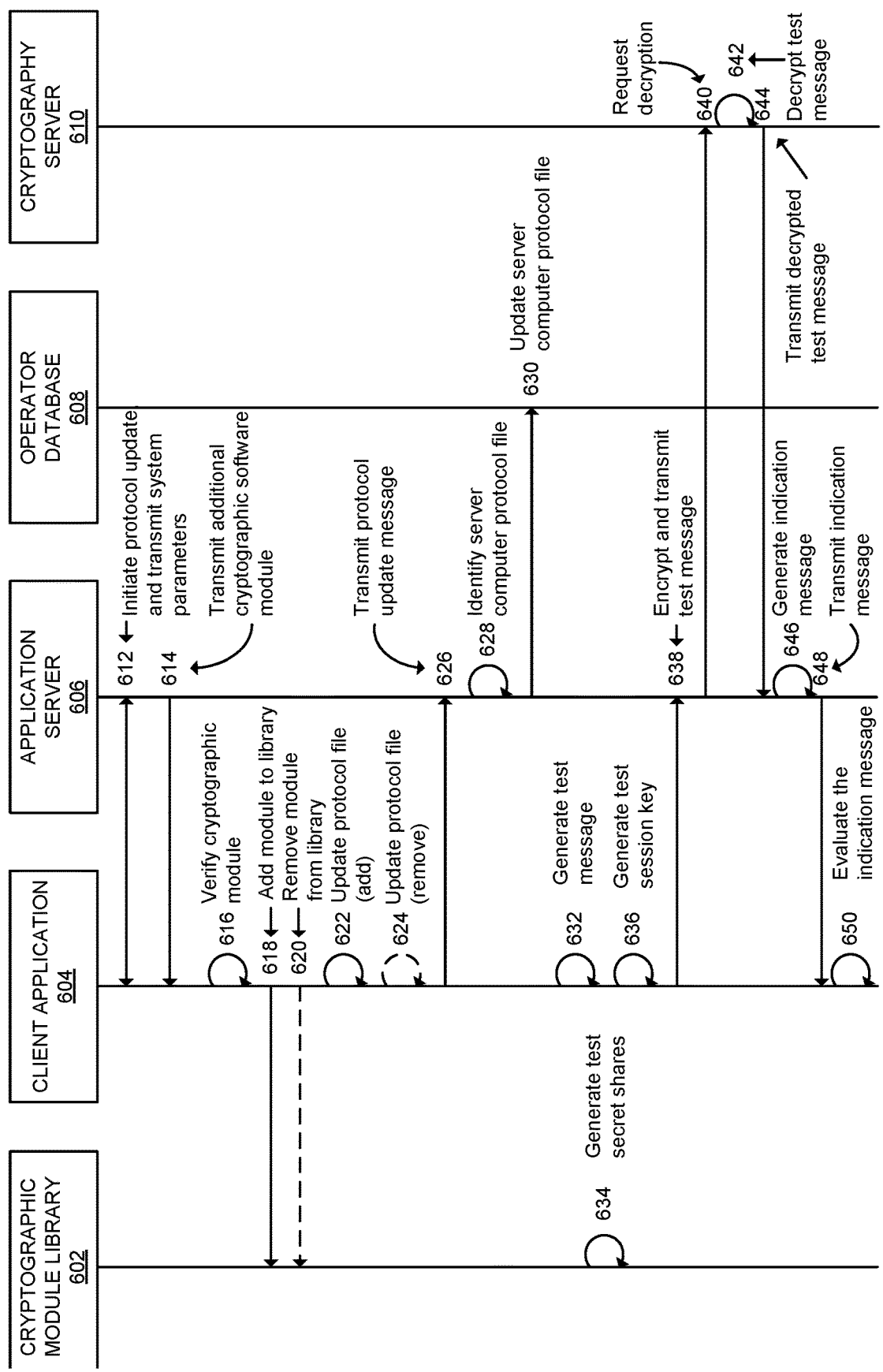
FIG. 6 shows a sequence diagram of a cryptographic deployment process according to some embodiments.

FIG. 6 shows a sequence diagram detailing methods that can be used during a cryptographic protocol update phase. FIG. 6 includes a series of steps 612-650. The cryptographic protocol update phase may occur after a cryptographic protocol is used to perform encryption or decryption (e.g., as described above in Section IV. As such, Some or all of the steps shown in FIG. 4 may precede the steps shown in FIG. 6, such as steps 418, 426, 428, 432, and 434. Some of the steps shown in FIG. 6 may be optional.

1. Adding or Removing Cryptographic Software Modules

At step 612, either the client application 604, operating on a computer system (not pictured) or the application server 606 can initiate the protocol update process. The protocol update process can involve, for example, including the use of one or more cryptographic software modules in the cryptographic protocol, removing one or more cryptographic software modules from the cryptographic protocol, defining a totally new cryptographic protocol (e.g., involving none of the previously used cryptographic software modules), etc. The cryptographic protocol update process can be initiated by an operator of the client application 604 (such as a merchant operator) or an operator of the application server 606 (such as a system administrator), in response to, for example, a new discovery or development in cryptography that renders one or more cryptographic software modules insecure. Alternatively, the client application 604 or application server 606 can be configured to periodically update the cryptographic protocol, e.g., annually, biannually, monthly, or according to any other update schedule. The computer system operating the client application 604 can initiate the update process by transmitting a request message to the application server 606.

The request message may request transmission of an additional cryptographic software module that the client application 604 intends to include in the cryptographic protocol. In some embodiments, the client application 604 can specifically identify the desired additional cryptographic software module, in others, the client application 604 can request an additional cryptographic software module without specifically identifying it. For example, the request message may identify the additional cryptographic software module based on an identifier (e.g., "PQC_x1", corresponding to a post-quantum cryptographic (PQC) software module "x1"). Alternatively, the request message may provide parameters that can be used by the application server 606 to identify an additional cryptographic software module, such as security requirements (e.g., "post-quantum secure"). The request message may additionally comprise computer system parameters corresponding to the computer system operating the client application 604. These computer system parameters may comprise, for example, information relating to the operating system, available memory, processor speed, etc. These system parameters may indicate the limitations or capabilities of the computer system operating the client application 604, with regards to operating or executing code associated with cryptographic software modules.

Instead of the client application 604 initiating the protocol update process with a request message, the application server 606 can initiate the update process by pushing an update to the client application 604. As an example, if the application server 606, the cryptography server 610, or operators of either and/or both these servers determine that a cryptographic protocol or cryptographic software module has been found to be insecure, the application server 606 may push a protocol update to the client application 604.

The application server 606 may select the additional cryptographic software module to transmit to the client application 604 during the cryptographic update process. In some embodiments, the server computer (e.g., a computer system or network comprising the application server 606 and/or cryptography server 610) may determine the additional cryptographic software module from a plurality of additional cryptographic software modules (stored for example in HSMs on the cryptography server 610) based on the computer system parameters. The application server 606 can use the computer system parameters to identify a cryptographic software module that the computer system operating the client application 604 is capable of using. Alternatively, if the cryptographic protocol update was initiated to account for a security vulnerability (e.g., a newly discovered viable cryptographic attack on a cryptosystem or family of cryptosystems), the application server 606 may select an additional cryptographic software module that is not vulnerable. The selected additional cryptographic software module may be signed and include a digital signature corresponding to the server computer (e.g., application server 606), a certificate authority, or a trusted execution environment device manufacturer.

At step 614, the application server 606 can transmit the additional cryptographic software module including a digital signature to the computer system operating the client application 604. The transmission may be performed, for example, after encryption and decryption operations have been performed by the client application 604 and application server 606, e.g., as described above in Section IV with reference to FIG. 4.

At step 616, the computer system operating the client application 604 can verify the cryptographic software module using a public key corresponding to the server computer (e.g., application server 606, cryptography server 610, or a combination thereof) or a certificate authority or a trusted execution environment device manufacturer. This can be accomplished by verifying the digital signature included in the additional cryptographic software module. The computer system operating the client application 604 can decrypt the digital signature using the public key, then evaluate the decrypted contents. For example, the digital signature may comprise an encrypted hash of the cryptographic software module. The client application 604 can generate its own hash of the cryptographic software module, then compare it to the hash produced by decrypting the digital signature. If the two hashes match, the client application 604 can confirm that the cryptographic software module is legitimate.

At step 618, if the additional cryptographic software module is verified successfully, the computer system operating the client application 604 can include the additional cryptographic software module in a cryptographic module library 602. In some embodiments, the cryptographic module library 602 may prevent the client application 604 from adding additional software modules that do not possess a valid digital signature.

Optionally at step 620, the client application 604 can remove a cryptographic software module from the cryptographic module library 602. For example, one of the cryptographic software modules may have become insecure due to advances in computer technology or the discovery of vulnerabilities, and it may be beneficial to remove it to free up space to add additional cryptographic software modules.

2. Updating Cryptographic Protocol File

At step 622, once the additional cryptographic software module has been included in the cryptographic module library 602, the computer system operating the client application 604 can update the computer system protocol file. The computer system protocol file may comprise a data file that identifies one or more cryptographic software modules used to generate session keys and encrypt messages. For example, a computer system protocol file including an identifier "PQC_x1" may indicate that the computer system should use a cryptographic software modules "PQC_x1" to generate a secret share that can be used to derive a session key. The computer system operating the client application may update the computer system protocol file to identify the additional cryptographic software module (e.g., by including an additional identifier in the computer system protocol file), in addition to one or more cryptographic software modules it was previously identifying.

Optionally, at step 624, if the computer system operating the client application 604 removed a cryptographic software module from the cryptographic module library 602 at step 620, the computer system operating the client application 604 can update the computer system protocol file to no longer identify at least one of the one or more cryptographic software modules, e.g., by removing identifiers corresponding to those cryptographic software modules.

At step 626, the computer system operating the client application 604 can transmit a protocol update message to the application server 606. Like many other steps shown in FIG. 6, this transmission may be performed after encryption and decryption operations have been performed prior to the cryptographic protocol update process, e.g., as described above in Section IV with reference to FIG. 4. The protocol update message can include a computer system identifier, can indicate that the computer system protocol file has been updated to include the additional cryptographic software module and (optionally) has excluded at least one of the one or more cryptographic software modules. The protocol update message can indicate to the application server 606 that the client application 604 is in the process of updating its computer system protocol file, and that the application server 606 can update its server computer protocol file to reflect the change, thus enabling the two systems to use the newly updated protocol to communicate.

At step 628, the application server 606 can use the computer system identifier included in the protocol update message to identify a server computer protocol file. This server computer protocol file can correspond to the computer system protocol file stored by the computer system operating the client application 604. The server computer protocol file may be stored in an operator database 608, which may store a plurality of server computer protocol files, each corresponding to cryptographic protocols negotiated between the application server and a plurality of computer systems, each operating their own respective client application.

At step 630, the application server 606 can update the server computer protocol file to indicate that the computer system protocol file identifies the additional cryptographic software module (and optionally has excluded at least one of the one or more cryptographic software modules). The application server 606 can update the server computer protocol file stored in the operator database 608 using any appropriate database management tools, techniques, or software.

3. Testing the New Cryptographic Protocol

After updating the computer system protocol file and the server computer protocol file, the computer system and server computer can perform a test of the cryptographic protocol to verify that it can be used to encrypt and decrypt messages sent between the computer system operating the client application 604 and the application server 606.

At step 632, the computer system operating the client application 604 can generate a test message. The computer system may later encrypt this test message in order to test the new cryptographic protocol. This test message may comprise a common reference string known to both the client application 604 and the application server 606 that enables the client application 604 and the application server 606 to verify that the protocol was updated successfully. Alternatively, the test message may comprise data that is representative of messages usually encrypted and transmitted by the client application 604. For example, if the client application 604 is used to securely communicate payment information, the test message may comprise "dummy" payment information, such as a fake payment account number and fake transaction information. Alternatively, the test message may comprise an arbitrary or random number.

At step 634, the computer system operating the client application 604 can use the cryptographic software modules and the additional cryptographic software module identified by the computer system protocol file to generate a plurality of test shared secrets. The test secret shares may correspond to each of the cryptographic software modules and the additional cryptographic software module, and can be generated using functions associated with these cryptographic software modules. For example, each test shared secret may comprise a cryptographic key generated using a key generation function corresponding to a particular cryptographic software module.

At step 636, the computer system operating the client application 604 can generate a test session key using the key derivation function and the plurality of test shared secrets, e.g., as described above in Section IV and throughout the rest of this disclosure.

At step 638, the computer system operating the client application 604 can encrypt the test message using the test session key and transmit the encrypted test message to the application server 606. The encryption can use any suitable cryptographic protocol as specified by the current computer system protocol file.

After receiving the encrypted test message, at step 640, the application server 606 can communicate with the cryptography server 610 in order to decrypt the test message. The application server 606 can transmit one or more key identifiers to the cryptography server 610, in order for the cryptography server 610 to identify a plurality of cryptographic software modules that can be used to generate a plurality of secret shares and the session key. Alternatively, if the session key is precomputed, the cryptography server can identify and retrieve the session key stored in its hardware security modules. After generating or retrieving the session key, the cryptography server 610 can use to decrypt the encrypted test message.

At step 642, the cryptography server 610 can generate a plurality of test secret shares, then use the plurality of test secret shares to generate the test session key, then use the test session key to decrypt the encrypted test message. If the session key is precomputed and stored in a hardware security module, the cryptography server 610 may not need to generate the plurality of test secret shares, and thus step 642 is optional.

At step 644, the cryptography server 610 can transmit the decrypted test message back to the application server 606.

At step 646, the application server 606 can generate an indication message based on the test message. In some embodiments, the indication message may be the same as the test message. For example, if the test message comprises a string such as "test message", the indication message may comprise the same string "test message". This indication message can be transmitted back to the client application 604 and enable the client application 604 to verify that the test was completed successfully by comparing the test message to the indication message. In other embodiments, the indication message may comprise a hash of the test message, hashed using a hashing algorithm known to both the client application 604 and the application server 606. In other embodiments, the indication message may be a statement such as "TRUE" or "FALSE" indicating whether the test message was decrypted successfully. This configuration may be applicable in embodiments where the test message comprises data that is known to both the client application 604 and the application server 606, such as a common reference string. The application server 606 can compare the decrypted test message to the common reference string and generate an indication message "TRUE" if they match, and "FALSE" otherwise.

At step 648, the application server 606 can transmit the indication message to the computer system operating the client application.

At step 650, the computer system operating the client application 604 can confirm that the server computer protocol file was updated successfully by evaluating the indication message. In some embodiments, where the indication message comprises the test message, the computer system can confirm that the server computer protocol file was updated successfully by confirming a match between the indication message and the test message. In other embodiments, where the indication message comprises a hash of the test message, the client application may generate a hash of the test message and compare it to the indication message to confirm that the protocol test was conducted successfully.

B. Updating Cryptographic Protocol System Diagram

Figure 7:
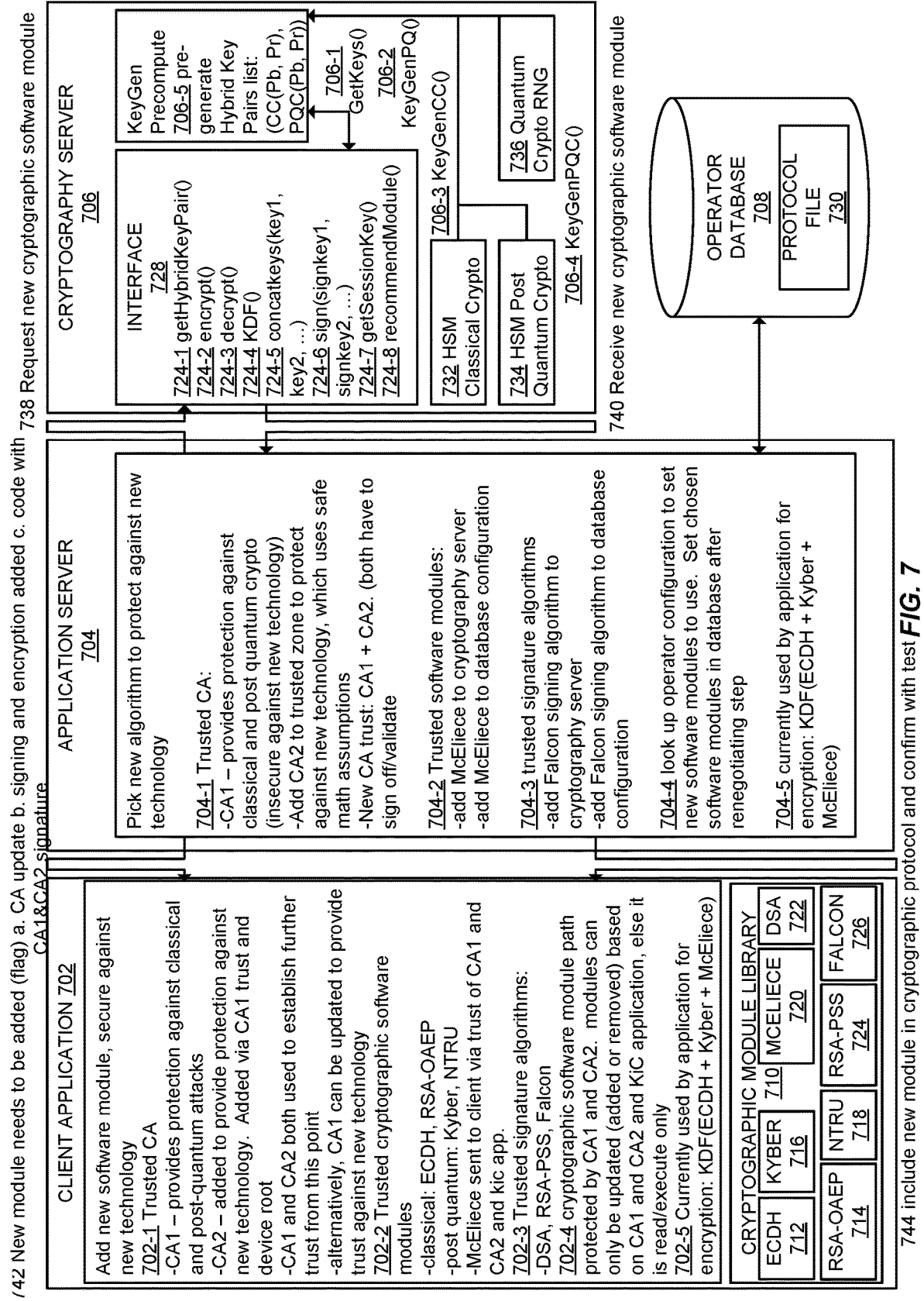
FIG. 7 shows a system diagram of a cryptographic deployment process according to some embodiments.

FIG. 7 shows a system diagram corresponding to an exemplary protocol update process according to some embodiments. In the example of FIG. 7, it is assumed that some new computer technology has been developed that renders the cryptographic protocol insecure. For example, the new computer technology could enable the use of algorithms that can factor large numbers in polynomial time. As such, the cryptographic protocol can be updated to use an additional cryptographic software module that is secure against such attacks. In this example, this software module is denoted McEliece 720. Further, because this new computer technology may enable forgery of digital signatures backed by a CA1, the client application 702 and application server 704 may need to establish trust in a new certificate authority CA2 that provides protection against the new technology.

Either the client application 702 or the application server 704 can initiate the cryptographic protocol update process. The client application 702 can transmit a message to the application server 704 indicating that the operator of the client application 702 wants to update the cryptographic protocol. Alternatively, the application server 704 can push an update to the client application 702. In some embodiments, as indicated by labels 702-1 and 704-1, the client application 702 and application server 704 may need to establish trust in a new certificate authority CA2 prior to updating the cryptographic protocol. This new certificate authority may use safe math assumptions that protect against new technology or new forms of cryptographic attack. CA2 can be added to the trusted zone via CA1 trust and device root. CA1 and CA2 can be used to establish further trust after CA2 is added. From this point, signatures corresponding to CA1 and CA2 can be used to verify cryptographic software modules, for example, in order to verify a new cryptographic software module, the client application 702 can verify that it contains a valid signature corresponding to both CA1 and CA2. As an alternative to including the new certificate authority CA2, CA1 can instead be updated to provide trust against the new technology.

At steps 704-2 the application server 704 or an operator of the application server 704 can update the cryptography server 706 to include the new cryptographic software module McEliece 720. Additionally, the application server 704 or an operator of the application server 704 can update the operator database 708 to specify that the cryptographic software module McEliece 720 can be used in cryptographic protocols. At step 704-3, the application server 704 or an operator of the application server 704 can update the cryptography server 706 to include the new quantum-safe signing module Falcon 726. Additionally, the application server 704 or an operator of the application server 704 can update the operator database 708 to specify that Falcon 726 can be used to digitally sign messages.

At step 738, the application server 704 can request a new cryptographic software module from the cryptography server 706. The application server 704 can communicate with the cryptography server 706 via its interface 728. The application server 704 may use an interface function such as the recommendModule( ) function in this request. This interface function can use information such as system and performance capabilities, as well as requested functionality to identify a cryptographic software module that can be operated by the computer system operating the client application 702. For example, the application server 704 may request that the cryptography server 706 recommends a software module that is secure against the new computer technology or newly developed cryptographic attack.

At step 740, the application server 704 can then receive the recommended module from the cryptography server 706.

In some embodiments, the application server 704 can also receive a signing module Falcon 726 used to produce digital signatures that cannot be forged using the new computer technology. The code corresponding to the new cryptographic software module McEliece 720 and the new signing module Falcon 726 can be signed or validated by the two certificate authorities CA1 and CA2.

At step 742, the application server 704 can transmit these cryptographic software modules to the client application 702 along with a message indicating that the cryptographic protocol should be updated to include the new cryptographic software modules.

The client application 702 can verify the signatures corresponding to CA1 and CA2 in order to verify that the new cryptographic software modules are legitimate. After doing so, the client application 702 can include the cryptographic software modules in its cryptographic module library 710. In the example shown by FIG. 7, as indicated by label 702-2, the cryptographic module library 710 now contains eight software modules: two classical cryptography modules ECDH 712 and RSA-OAEP 714, two post-quantum modules Kyber 716 and NTRU 718, and the new quantum-safe module McEliece 720, and as indicated by label 702-3, three signing modules: DSA 722, RSA-PSS 724, and Falcon 726. As indicated by label 702-4, the cryptographic software module path is protected by CA1 and CA2. Modules can only be updated based on CA1, CA2, and the application server 704, otherwise these modules are read and execute only.

At step 744, the client application 702 and application server 704 can then negotiate the new cryptographic protocol. In this example, the new cryptographic protocol can comprise deriving a hybrid key using the ECDH cryptographic software module 712, the Kyber software module 716, and the McEliece software module 720. The client application 702 and application server 704 can modify their respective protocol files (e.g., server computer protocol file 730) to reflect the negotiated protocol. The application server 704 can store the protocol file 730 in its operator database 708.

At step 744, the client application and application server 704 can test the new protocol to verify that it will work for subsequent encryption and decryption operations. The client application 702 can encrypt a test message using a session key derived according to the new cryptographic protocol and transmit the encrypted test message to the application server 704. The application server 704 can look up the cryptographic protocol (sometimes referred to as an "operator configuration") in the operator database 708, then decrypt the encrypted test message. The application server 704 may use cryptography server 706 to decrypt the encrypted test message. Afterwards, the application server 704 can create an indication message based on the test message and transmit it back to the client application 702. The client application 702 can evaluate the verification message to determine if the test was completed successfully.

VI. Encrypting Messages Using New Cryptographic Protocol

After negotiating a new cryptographic protocol, updating the computer system and server computer protocol files, and testing the new cryptographic protocol, the computer system and server computer can use the new cryptographic protocol to securely communicate messages. This can be accomplished using similar steps, methods, or techniques as those described above in Section IV. B. The following example illustrates how a computer system can encrypt and transmit an "additional message" (to distinguish it from any message (s) sent prior to updating the cryptographic protocol) to the server computer. In this example, during a prior cryptographic protocol update, the computer system protocol file and server computer protocol file have been updated to identify an additional cryptographic algorithm (e.g., a quantum-resistant cryptographic algorithm) implemented using an additional cryptographic software module. The computer system protocol file and server computer protocol file my also identify one or more cryptographic software modules, in addition to the additional cryptographic software module. The one or more cryptographic software modules may comprise cryptographic software modules used to implement the cryptographic protocol prior to the cryptographic protocol update.

In order to encrypt the additional message, the computer system can use the computer system protocol file to identify the one or more cryptographic software modules and the additional cryptographic software module. Using these cryptographic software modules, the computer system can generate a plurality of additional secret shares corresponding to the one or more cryptographic software modules and the additional cryptographic software module. These secret shares can comprise, for example, cryptographic keys corresponding to each cryptosystem corresponding to each software module. As an example, a secret share corresponding to an AES module could comprise a symmetric AES key. As such, these secret shares can be generated using, for example, key generation algorithms implemented by the cryptographic software modules. One or more of the plurality of additional shared secrets can correspond to the one or more cryptographic software modules and one of these shared secrets can correspond to the additional cryptographic software module.

After generating the plurality of additional shared secrets, the computer system can generate an additional session key using a key derivation function and the plurality of additional secret shares. The key derivation function may be included in the cryptographic software module library stored on the computer system. The computer system can then encrypt the additional message using the additional session key to generate an additional encrypted message. The computer system can form an additional message packet comprising the additional encrypted message and a computer system identifier. The computer system can transmit this additional message packet to the server computer (over a network such as the Internet) in order to securely communicate the information or data stored in the additional message (e.g., login information, a payment account number, etc.).

If needed, the computer system can communicate any information necessary for the server computer to generate the additional shared secrets. For example, in embodiments that use encapsulation, the computer system can generate one or more encapsulations using an encapsulation function (or key encapsulation mechanism) and one or more cryptographic keys and transmit the encapsulations to the server computer. The one or more cryptographic key's may correspond to the cryptographic software modules used to generate the respective secret shares, e.g., the one or more cryptographic software modules and the additional cryptographic software module. Later, the server computer can use a de-encapsulation function and one or more corresponding cryptographic keys in order to generate the one or more shared secrets.

The server computer can receive the additional message packet, then use the computer system identifier to identify a server computer protocol file corresponding to the computer system protocol file. As an example, the server computer can identify the server computer protocol file by querying a database that stores database entries that relate server computer protocol files and their corresponding computer systems and/or relate server computer protocol files and corresponding operator accounts, which can be identified using computer system identifiers. This server computer protocol file can identify the cryptographic software modules used to generate the shared secrets, or alternatively, the cryptographic keys used by the server computer to generate the corresponding shared secrets.

The server computer can then generate the plurality of additional shared secrets corresponding to the server computer protocol file, using, for example, a plurality of cryptographic software modules stored on the server computer or a plurality of cryptographic keys. Alternatively, the server computer can request cryptographic services from a cryptographic server (such as cryptography server 118 from FIG. 1). If necessary, the server computer and/or cryptography server can use a de-encapsulation function to generate the plurality of additional secret shares using encapsulations received from the computer system.

Afterwards, the server computer (or the cryptographic server) can generate the additional session key using the key derivation function and the plurality of additional shared secrets. Using the additional session key, the server computer can decrypt the additional encrypted message to retrieve the additional message. The server computer can then perform any additional operations based on the additional message and the intended function of the server computer. For example, if the server computer is used to control access to a digital resource, such as a subscription streaming service, cloud computing service, etc., the server computer can evaluate login information contained in the additional message in order to authenticate the computer system. As another example, if the server computer is used to process payment transactions (e.g., credit card transactions), the server computer can evaluate payment information stored in the additional message and forward the additional message or the payment information to an authorizing entity, such as an issuing bank.

VII. Computer System

Figure 8:
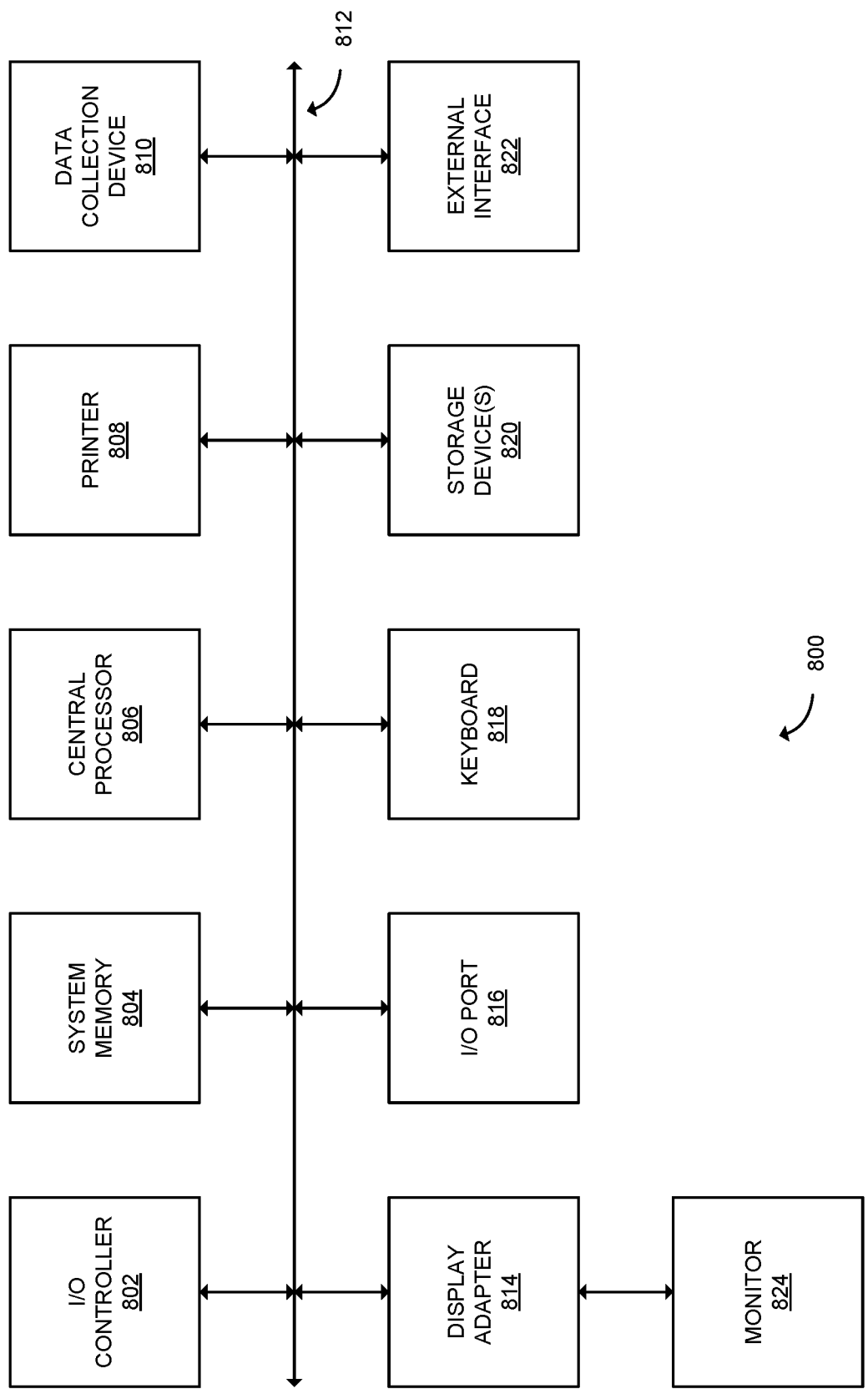
FIG. 8 shows an exemplary computer system according to some embodiments.

Any of the computer systems mentioned herein may utilize any suitable number of subsystems. Examples of such subsystems are shown in FIG. 8 in computer system 800. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 812. Additional subsystems such as a printer 808, keyboard 818, storage device(s) 820, monitor 824 (e.g., a display screen, such as an LED), which is coupled to display adapter 814, and others are shown. Peripherals and input/output (I/O) devices, which couple to I/O controller 802, can be connected to the computer system by any number of means known in the art such as input/output (I/O) port 816 (e.g., USB, FireWire®). For example, I/O port 816 or external interface 822 (e.g., Ethernet, Wi-Fi, etc.) can be used to connect computer system 800 to a wide area network such as the Internet, a mouse input device, or a scanner. The interconnection via system bus 812 allows the central processor 806 to communicate with each subsystem and to control the execution of a plurality of instructions from system memory 804 or the storage device(s) 820 (e.g., a fixed disk, such as a hard drive, or optical disk), as well as the exchange of information between subsystems. The system memory 804 and/or the storage device(s) 820 may embody a computer readable medium. Another subsystem is a data collection device 810, such as a camera, microphone, accelerometer, and the like. Any of the data mentioned herein can be output from one component to another component and can be output to the user.

A computer system can include a plurality of the same components or subsystems, e.g., connected together by external interface 822, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method for securely communicating a message comprising performing, by a computer system:
   identifying one or more cryptographic software modules based on a computer system protocol file, wherein the one or more cryptographic software modules are a subset of a cryptographic software module library stored on the computer system;
   generating one or more shared secrets corresponding to the one or more cryptographic software modules;
   generating a session key using a key derivation function and the one or more shared secrets;
   encrypting the message using the session key to generate an encrypted message;
   transmitting a message packet comprising the encrypted message and a computer system identifier to a server computer, wherein the server computer is configured to use the computer system identifier to identify a server computer protocol file, generate the one or more shared secrets, generate the session key, and decrypt the encrypted message;
   subsequent to transmitting the message packet, updating the computer system protocol file to identify an additional cryptographic software module in addition to the one or more cryptographic software modules; and
   transmitting a protocol update message to the server computer, the protocol update message indicating that the computer system protocol file has been updated, wherein the protocol update message comprises the computer system identifier for use by the server computer in identifying the server computer protocol file to be updated.

2. The method of claim 1, wherein the one or more shared secrets are generated using an encapsulation function and one or more cryptographic keys corresponding to the one or more cryptographic software modules, and wherein the method further comprises:
   generating one or more encapsulations using a key encapsulation mechanism and the one or more cryptographic keys; and
   transmitting the one or more encapsulations to the server computer, wherein the server computer is configured to use a de-encapsulation function and one or more corresponding cryptographic keys to generate the one or more shared secrets.

3. The method of claim 1, further comprising:
   generating a session signing key using the key derivation function and the one or more shared secrets; and
   generating a digital signature by signing the message packet using the session signing key, wherein the server computer is configured to verify the digital signature after receiving the message packet.

4. The method of claim 1, wherein the message comprises a credential used to authorize an interaction between a user of a user device and a resource provider operator of the computer system, and wherein the method further comprises receiving the credential from the user device.

5. The method of claim 1, further comprising, prior to identifying the one or more cryptographic software modules:
   receiving, from the server computer, the one or more cryptographic software modules during a registration process;
   storing the one or more cryptographic software modules in the cryptographic software module library; and
   modifying the computer system protocol file to identify the one or more cryptographic software modules.

6. The method of claim 1, further comprising, prior to updating the computer system protocol file:
   receiving, from the server computer, an additional cryptographic software module, wherein the additional cryptographic software module includes a digital signature;
   verifying the digital signature using a public key corresponding to the server computer or a certificate authority or a trusted execution environment device manufacturer; and
   including the additional cryptographic software module in the cryptographic software module library.

7. The method of claim 6, further comprising, prior to receiving the additional cryptographic software module, transmitting a request message to the server computer, the request message requesting transmission of the additional cryptographic software module.

8. The method of claim 1, further comprising:
updating the computer system protocol file to no longer identify at least one of the one or more cryptographic software modules; and
transmitting a protocol update message to the server computer, the protocol update message indicating that the computer system protocol file has been updated, the protocol update message further comprising the computer system identifier, wherein the server computer is configured to identify the server computer protocol file using the computer system identifier and update the server computer protocol file to no longer identify at least one of the one or more cryptographic software modules.

9. The method of claim 1, further comprising:
identifying the one or more cryptographic software modules and the additional cryptographic software module based on the computer system protocol file;
generating a plurality of additional shared secrets corresponding to the one or more cryptographic software modules and the additional cryptographic software module;
generating an additional session key using the key derivation function and the plurality of additional shared secrets;
encrypting an additional message using the additional session key to generate an additional encrypted message; and
transmitting an additional message packet comprising the additional encrypted message and the computer system identifier to the server computer, wherein the server computer is configured to use the computer system identifier to identify the server computer protocol file, generate the plurality of additional shared secrets, generate the additional session key, and decrypt the additional encrypted message.

10. The method of claim 1, further comprising:
generating a test message;
generating a plurality of test shared secrets corresponding to the one or more cryptographic software modules and the additional cryptographic software module;
generating a test session key using the key derivation function and the plurality of test shared secrets;
encrypting the test message using the test session key to generate an encrypted test message;
transmitting the encrypted test message to the server computer, wherein the server computer is configured to generate the plurality of test shared secrets, generate the test session key, decrypts the encrypted test message, and generate an indication message based on the test message;
receiving the indication message from the server computer; and
confirming that the server computer protocol file was updated successfully based on the indication message.

11. The method of claim 10, wherein the indication message comprises the test message, wherein the computer system confirms that the server computer protocol file was updated successfully by confirming a match between the indication message and the test message.

12. A method for securely communicating a message comprising performing, by a server computer:
receiving, from a computer system, a message packet comprising an encrypted message and a computer system identifier, wherein the encrypted message is encrypted using a session key, the session key generated by the computer system using a key derivation function and one or more shared secrets generated using one or more cryptographic software modules;
identifying a server computer protocol file based on the computer system identifier;
generating one or more shared secrets corresponding to the server computer protocol file;
generating the session key using the key derivation function and the one or more shared secrets;
decrypting the encrypted message using the session key to obtain the message; and
subsequent to obtaining the message, transmitting, to the computer system, an additional cryptographic software module, wherein the additional cryptographic software module includes a digital signature, and wherein the computer system is configured to:
verify the additional cryptographic software module by verifying the digital signature using a public key corresponding to the server computer, a certificate authority, or a trusted execution environment device manufacturer, and
add the additional cryptographic software module to a cryptographic software module library.

13. The method of claim 12, further comprising receiving, from the computer system, one or more encapsulations corresponding to the one or more shared secrets,
wherein generating one or more shared secrets corresponding to the server computer protocol file and generating the session key using the key derivation function and the one or more shared secrets is accomplished by:
transmitting the one or more encapsulations to a cryptography server, wherein the cryptography server is configured to:
identify one or more private keys corresponding to the one or more encapsulations,
produce the one or more shared secrets by de-encapsulating the one or more encapsulations using the one or more private keys,
generate the session key using the key derivation function and the one or more shared secrets, and
transmit the session key to the server computer.

14. The method of claim 12, further comprising, prior to transmitting the additional cryptographic software module:
receiving, from the computer system, a request message, the request message including the computer system identifier and computer system parameters; and
determining, based on the computer system parameters, the additional cryptographic software module from a plurality of additional cryptographic software modules.

15. The method of claim 12, further comprising, prior to receiving the message packet:
transmitting, to the computer system, the one or more cryptographic software modules during a registration process, wherein the computer system is configured to store the one or more cryptographic software modules in the cryptographic software module library and modify a computer system protocol file to identify the one or more cryptographic software modules.

16. The method of claim 12, further comprising:
receiving, from the computer system, a protocol update message, the protocol update message indicating that a computer system protocol file stored on the computer system has been updated to identify the additional cryptographic software module, the protocol update message additionally comprising the computer system identifier;

identifying the server computer protocol file using the computer system identifier; and updating the server computer protocol file to indicate that the computer system protocol file identifies the additional cryptographic software module.

17. The method of claim 16, further comprising:

receiving, from the computer system, an additional message packet comprising an additional encrypted message and the computer system identifier;

identifying the server computer protocol file using the computer system identifier;

generating a plurality of additional shared secrets corresponding to the server computer protocol file, the plurality of additional shared secrets comprising the one or more shared secrets and an additional shared secret corresponding to the additional cryptographic software module;

generating an additional session key using the key derivation function and the plurality of additional shared secrets; and decrypting the additional encrypted message using the session key to retrieve an additional message.

18. The method of claim 16, further comprising:

receiving, from the computer system, an encrypted test message;

generating one or more test secret shares based on the server computer protocol file;

generating a test session key using the key derivation function and the one or more test secret shares;

decrypting the encrypted test message using the test session key to produce a test message;

generating an indication message based on the test message; and transmitting the indication message to the server computer.

19. The method of claim 18, wherein the indication message comprises the test message.

20. A computer system comprising:

a processor; and a non-transitory computer readable medium coupled to the processor, the non-transitory computer readable medium comprising code, executable by the processor for implementing a method for securely communicating a message, the method comprising:

identifying one or more cryptographic software modules based on a computer system protocol file, wherein the one or more cryptographic software modules are a subset of a cryptographic software module library stored on the computer system;

generating one or more shared secrets corresponding to the one or more cryptographic software modules;

generating a session key using a key derivation function and the one or more shared secrets;

encrypting the message using the session key to generate an encrypted message;

transmitting a message packet comprising the encrypted message and a computer system identifier to a server computer, wherein the server computer is configured to use the computer system identifier to identify a server computer protocol file, generate the one or more shared secrets, generate the session key, and decrypt the encrypted message;

subsequent to transmitting the message packet, updating the computer system protocol file to identify an additional cryptographic software module in addition to the one or more cryptographic software modules; and transmitting a protocol update message to the server computer, the protocol update message indicating that the computer system protocol file has been updated, wherein the protocol update message comprises the computer system identifier for use by the server computer in identifying the server computer protocol file to be updated.

* * * * *